(12) United States Patent
Yi et al.

(10) Patent No.: US 10,913,427 B2
(45) Date of Patent: *Feb. 9, 2021

(54) PASSENGER AND VEHICLE MUTUAL AUTHENTICATION

(71) Applicant: Beijing Voyager Technology Co., Ltd., Beijing (CN)

(72) Inventors: Xiaoyong Yi, Fremont, CA (US); Fengmin Gong, Los Gatos, CA (US); Jiang Zhang, San Jose, CA (US); Qi Chen, Burlingame, CA (US); Yu Wang, San Jose, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,590

(22) Filed: Oct. 25, 2019

(65) Prior Publication Data

US 2020/0223396 A1 Jul. 16, 2020

Related U.S. Application Data

(63) Continuation of application No. 16/192,567, filed on Nov. 15, 2018, now Pat. No. 10,501,055.

(51) Int. Cl.
*B60R 25/25* (2013.01)
*H04W 12/04* (2021.01)
(Continued)

(52) U.S. Cl.
CPC ............ *B60R 25/252* (2013.01); *B60R 25/25* (2013.01); *B60R 25/255* (2013.01);
(Continued)

(58) Field of Classification Search
CPC ... H04W 12/0401; G06Q 50/30; G05D 1/021; H04L 9/0866; B60R 25/252; B60R 25/25
(Continued)

(56) References Cited

U.S. PATENT DOCUMENTS 10,501,055 B1 * 12/2019 Yi .................... G06Q 50/30
2011/0112969 A1   5/2011 Zaid et al.
(Continued)

FOREIGN PATENT DOCUMENTS

WO    2017205961    12/2017

OTHER PUBLICATIONS

U.S. Appl. No. 16/192,567, "Non-Final Office Action", dated Aug. 2, 2019, 6 pages.
(Continued)

*Primary Examiner* — Vernal U Brown
(74) *Attorney, Agent, or Firm* — Kilpatrick Townsend & Stockton LLP

(57) ABSTRACT

Aspects of the invention are directed to techniques for mutual authentication between a passenger that has requested a transportation service and a dispatched vehicle for providing the requested transportation service. A user device associated with the passenger verifies the dispatched vehicle using a vehicle access token generated by a transportation service platform and sends a secret key to the dispatched vehicle. The dispatched vehicle uses the secret key to recover passenger biometric information from a passenger secret received from the user device through the transportation service platform, captures passenger biometric information on-site, and compares the recovered passenger biometric information and the passenger biometric information collected on-site to verify the passenger.

20 Claims, 10 Drawing Sheets

(51) Int. Cl.
  *G06Q 50/30* (2012.01)
  *H04L 9/08* (2006.01)
  *G05D 1/02* (2020.01)
(52) U.S. Cl.
  CPC ........... *B60R 25/257* (2013.01); *G06Q 50/30* (2013.01); *H04L 9/0866* (2013.01); *H04L 9/0891* (2013.01); *H04W 12/0401* (2019.01); *B60R 2325/101* (2013.01); *B60R 2325/108* (2013.01); *G05D 1/021* (2013.01); *G05D 2201/0213* (2013.01)
(58) Field of Classification Search
  USPC ........................................................ 340/5.52
  See application file for complete search history.

(56) References Cited

U.S. PATENT DOCUMENTS

| 2015/0346727 | A1 | 12/2015 | Ramanujam |
| 2015/0363986 | A1 | 12/2015 | Hoyos et al. |
| 2016/0224776 | A1 | 8/2016 | Leow |
| 2017/0153714 | A1 | 6/2017 | Gao et al. |
| 2017/0213403 | A1 | 7/2017 | Diehl et al. |
| 2017/0267256 | A1 | 9/2017 | Minster et al. |
| 2018/0068505 | A1 | 3/2018 | Mullett |
| 2018/0074494 | A1 | 3/2018 | Myers et al. |
| 2018/0299895 | A1 | 10/2018 | Knotts et al. |
| 2019/0031144 | A1 | 1/2019 | Gat |

OTHER PUBLICATIONS

U.S. Appl. No. 16/192,567, "Notice of Allowance", dated Sep. 26, 2019, 5 pages.
EP18880053.6, "Extended European Search Report", dated Nov. 8, 2019, 5 pages.
PCT/US2018/064591, "International Search Report and Written Opinion", dated Feb. 22, 2019, 10 pages.

* cited by examiner

PASSENGER AND VEHICLE MUTUAL AUTHENTICATION

CROSS REFERENCES TO RELATED APPLICATIONS

This application is a continuation of U.S. Non-Provisional patent application Ser. No. 16/192,567, filed Nov. 15, 2018 and titled "PASSENGER AND VEHICLE MUTUAL AUTHENTICATION," the disclosure of which is herein incorporated by reference in its entirety for all purposes.

BACKGROUND

A self-driving vehicle (also referred to as an autonomous vehicle or a driverless car) is a vehicle that is capable of sensing its environment and navigating without much human input. An autonomous car may be used to offer on-demand transportation service, such as acting as an unmanned taxi. Autonomous driving technology may offer many benefits, such as reducing transportation cost, reducing the needs for parking space, reducing the number of vehicles need, reducing traffic congestion, and the like. However, there are still many challenges and risks associated with autonomous vehicles, such as safety, security, and privacy issues.

BRIEF SUMMARY

Techniques disclosed herein relate to autonomous vehicles. More specifically, and without limitation, disclosed herein are techniques for improving safety and security for both autonomous vehicles and passengers riding the autonomous vehicles. Techniques disclosed herein may help to solve safety and security issues caused by, for example, user devices being stolen, vehicles being hacked, vehicles being owned or operated by malicious people, and the like. According to some embodiments, a mutual authentication technique is used to not only authenticate a passenger that has requested an autonomous vehicle, but also verify that the particular vehicle is the vehicle requested by the passengers. Various inventive embodiments are described herein, including devices, systems, methods, non-transitory computer-readable storage media storing programs, code, or instructions executable by one or more processors, and the like.

According to certain embodiments, a mutual authentication technique that utilizes passenger biometric information, rather than merely relying on machine generated security codes, passwords, or tokens, may be used to authenticate both the autonomous vehicle and the passengers. In one example, a method may include generating a secret key and a passenger secret by a user device associated with a passenger based on biometric information of the passenger and the secret key, and sending a transportation service request and the passenger secret by the user device to a transportation service platform. The method may also include determining an autonomous vehicle and a vehicle access token (VAT) for the autonomous vehicle by the transportation service platform in response to the transportation service request, sending a first copy of the VAT by the transportation service platform to the user device, and sending the passenger secret and a second copy of the VAT by the transportation service platform to the autonomous vehicle. The method may further include reading the second copy of the VAT by the user device from the autonomous vehicle, sending the secret key by the user device to the autonomous vehicle based on determining that the second copy of the VAT read by the user device from the autonomous vehicle matches the first copy of the VAT sent from the transportation service platform to the user device. The method may also include recovering the biometric information of the passenger from the passenger secret by the autonomous vehicle using the secret key, capturing biometric information of a user of the user device by the autonomous vehicle, and unlocking the autonomous vehicle based on a matching between the recovered biometric information of the passenger and the captured biometric information of the user.

In some embodiments, the transportation service platform may include an operation server and a security server. Determining the autonomous vehicle and the VAT may include selecting the autonomous vehicle by the operation server from a plurality of autonomous vehicles, sending a dispatch request including an identification of the autonomous vehicle and the passenger secret by the operation server to the security server, and determining the VAT for the autonomous vehicle by the security server.

In some embodiments, the method may further include determining an expiration time period for the VAT by the transportation service platform, and sending the expiration time period for the VAT by the transportation service platform to the user device. In some embodiments, reading the second copy of the VAT by the user device from the autonomous vehicle may include reading the second copy of the VAT from the autonomous vehicle only before the expiration time period expires.

According to certain embodiments, a method may include receiving a passenger secret and a request for a transportation service by a transportation service platform, where the passenger secret may include passenger biometric information encrypted using a secret key that is generated by a user device. The method may also include, by the transportation service platform, selecting a vehicle for providing the requested transportation service based on the request, determining a vehicle access token (VAT) for the selected vehicle, sending a first copy of the VAT to the user device, and sending the passenger secret and a second copy of the VAT to the selected vehicle. A match between the first copy of the VAT and the second copy of the VAT may indicate that a vehicle having the second copy of the VAT is the selected vehicle. The passenger secret may be used for authenticating a user of the user device based on biometric information of the user, before unlocking a door of the selected vehicle for providing the requested transportation service. In some embodiments, the method may also include determining an expiration time period for the VAT, and sending the expiration time period for the VAT to the user device, where the match between the first copy of the VAT and the second copy of the VAT may be invalid after the expiration time period.

In some embodiments, the transportation service platform may include an operation server and a security server, where selecting the vehicle and determining the VAT may include selecting the selected vehicle from a plurality of vehicles by the operation server, sending a dispatch request including an identification of the selected vehicle and the passenger secret by the operation server to the security server, and determining the VAT for the selected vehicle by the security server. In some embodiments, sending the first copy of the VAT to the user device may include sending the first copy of the VAT by the security server to the operation server, and sending the first copy of the VAT by the operation server to the user device.

In some embodiments, the passenger biometric information may include at least one of a fingerprint, an iris pattern, a voice spectrum, or a facial feature. In some embodiments, the method may also include storing the passenger secret by the transportation service platform, where the passenger secret may have an expiration time after which the passenger secret is invalid. In some embodiments, the method may include setting the VAT as an invalid VAT after an expiration time period has expired.

According to certain embodiments, a method may include capturing passenger biometric information of a passenger associated with a user device by a sensor on the user device, generating a secret key by the user device, generating a passenger secret by encrypting the passenger biometric information using the secret key, sending a transportation service request and the passenger secret to a transportation service platform, receiving a first vehicle access token (VAT) from the transportation service platform, reading a second VAT from a vehicle, comparing the first VAT and the second VAT, and sending, by the user device based on determining that the first VAT matches the second VAT, the secret key to the vehicle for decrypting the passenger secret and authenticating the passenger based on the passenger biometric information.

In some embodiments, the method may further include receiving an expiration time for the first VAT from the transportation service platform, where comparing the first VAT and the second VAT may include only comparing the first VAT and the second VAT before the expiration time expires. In some embodiments, the method may further include determining that the expiration time has expired, and sending a request for renewing the first VAT or a request for a new VAT. In some embodiments, the secret key or the passenger secret may have a respective expiration time. In some embodiments, the passenger biometric information includes at least one of a fingerprint, an iris pattern, a voice spectrum, or a facial feature. In some embodiments, reading the second VAT from the vehicle may include reading the second VAT using a near-field communication receiver, a Bluetooth receiver, a WiFi receiver, a WiMax receiver, or a ZigBee receiver.

According to certain embodiments, a method may include receiving a passenger secret and a vehicle access token (VAT) by a vehicle, where the passenger secret may include passenger biometric information of a passenger, and the passenger biometric information in the passenger secret may be encrypted using a secret key that is generated by a user device associated with the passenger. The method may also include providing the VAT by the vehicle to the user device, receiving the secret key by the vehicle from the user device after the user device verifies the vehicle using the VAT, recovering the passenger biometric information from the passenger secret by the vehicle using the secret key, capturing on-site biometric information of a user of the user device by the vehicle, and unlocking a door of the vehicle by the vehicle based on a matching between the recovered passenger biometric information and the captured on-site biometric information of the user.

In some embodiments, the passenger biometric information may include at least one of a fingerprint, an iris pattern, a voice spectrum, or a facial feature. In some embodiments, the vehicle may be an autonomous vehicle. In some embodiments, providing the secret key to the user device may include providing the secret key to the user device using a near-field communication receiver, a Bluetooth receiver, a WiFi receiver, a WiMax receiver, or a ZigBee receiver. In some embodiments, at least one of the VAT, the passenger secret, or the secret key may have an expiration time.

Techniques disclosed herein may offer various improvements and advantages over existing techniques. For example, the vehicle may obtain the passenger secret and the secret key from different sources (e.g., a security server and a user device, respectively), and the passenger may not be authenticated if any one of the passenger secret and the secret key is not correct. Thus, an imposter would not be authenticated if the imposter could not obtain both the right passenger secret and the secret key before any one of them expires. Furthermore, by using the passenger biometric information, rather than merely relying on a user device (e.g., a smartphone, which may be stolen, found, and/or hacked by a person other than the owner of the user device) that may have the correct passenger secret and the secret key, to authenticate the passenger that has requested the autonomous vehicle, both the user device used by the passenger and the passenger may be authenticated to better protect the vehicle against imposters. In addition, a user may also verify that the vehicle is indeed the requested vehicle or a vehicle from the desired service provider, rather than a vehicle that may have been stolen, hacked, hijacked, or otherwise compromised (e.g., being modified). Thus, the techniques may also reduce safety and security issues caused by, for example, vehicles being compromised or vehicle being owned or operated by malicious people, and the like, thus improving passenger safety and experience.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which like reference numerals refer to like components or parts throughout the drawings.

DETAILED DESCRIPTION

Figure 1A:
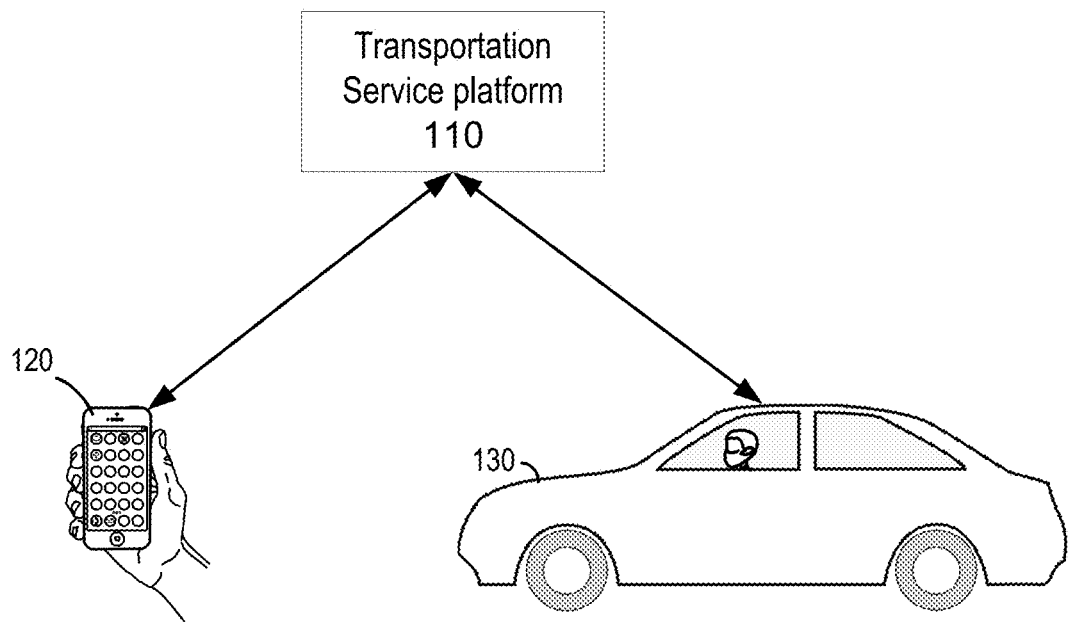
FIG. 1A illustrates an example of an environment for providing transportation service.

Techniques disclosed herein relate generally to autonomous vehicles, and more specifically, to techniques for improving safety and security for both autonomous vehicles and passengers riding the autonomous vehicles. In transportation services provided by autonomous vehicles, there is generally no driver to verify whether a passenger riding the vehicle is indeed the passenger who has requested the service. Thus, to protect the vehicle from being accessed by an unauthorized person, an alternative technique need to be used to authenticate the passenger before access is granted. In addition, for passenger safety and/or privacy, the autonomous vehicle may need to be authenticated as well to ensure that the vehicle is genuinely the requested and dispatched vehicle and to ensure the integrity of the vehicle.

According to certain embodiments, a mutual authentication technique that utilizes a combination of passenger biometric information and mobile device associated with the passenger (rather than merely relying on mobile device generated, transmitted, or received security codes, passwords, or tokens) is used to authenticate both the autonomous vehicle and the passenger. In one example, biometric information of a passenger (such as fingerprints, retina and iris patterns, or voice wave spectrum) may be captured and encoded (or encrypted) by a secret key generated by a user device associated with the passenger to generate a passenger secret. The user device may send the passenger secret with a request for transportation service to the operation server of a transportation service platform. The operation server may select an autonomous vehicle for providing the service based on the request, such as based on the location of the passenger and the destination address. The operation server may then send the identification of the selected vehicle, information regarding the requested service (e.g., source location, destination location, time of service, etc.), the passenger secret, and other information in a dispatch request to a security server of the transportation service platform. The security server may generate a vehicle access token (VAT) and the expiration time of the VAT in response to the dispatch request and send the VAT and the expiration time back to the operation server. The operation server may send the VAT and the expiration time to the user device as a response to the request for transportation service. The security server may also provide the passenger secret, the requested service (e.g., source location, destination location, time of service, etc.), the VAT, and the expiration time to the vehicle based on the identification of the selected vehicle.

The selected vehicle may arrive at the source location within a certain time period (e.g., within the expiration time of the VAT). The user device may read the VAT from the autonomous vehicle using NFC or other communication technologies. The user device may then compare the VAT read from the autonomous vehicle and the VAT received from the operation server. If the two VATs match, the user device may determine that the autonomous vehicle is the one dispatched by the operation server or the security server. After the autonomous vehicle is authenticated, the user device may send the secret key that it has generated for encrypting the biometric information of the passenger. The autonomous vehicle may then collect passenger biometric information on site, decrypt the passenger secret using the passenger secret key to generate expected passenger biometric information, and compare the collected passenger biometric information and the expected passenger biometric information to determine if the person requesting access to the vehicle is the passenger that has requested the transportation service. If the passenger is authenticated, the autonomous vehicle may unlock the door and give the passenger the access to the internal of the vehicle.

In some embodiments, the passenger secret may be saved at the user device and/or the security server. Because the passenger secret is the result of an encryption and the passenger secret key is in the user device, even if the passenger secret is leaked, it may not be used by an imposter to access a vehicle because the secret key is in the user device (and thus other devices may not have the right secret key) and passenger biometric information is collected on-site to verify the passenger (and thus the biometric information of the imposter may not match the decrypted passenger biometric information of the actual requester even if the user device is lost or stolen or the secret key is leaked).

In some embodiments, any one of the secret key, passenger secret, and VAT may have an expiration time and may become invalid after the expiration time. In some embodiments, the VAT and the passenger secret (or the secret key) may be renewed or regenerated if the transaction takes too long to complete, for example, when the commute time is longer than estimated. In some embodiments, any one of the secret key, passenger secret, VAT, and biometric information of the passenger may expire immediately or may be removed from the user device, autonomous vehicle, operation server, or security server after the mutual authentication completes.

Therefore, the techniques disclosed herein may use multiple secure measures to authenticate both the autonomous vehicle, the user device, and the passenger requesting access to the internal of the autonomous vehicle, thus improving the safety and security of both the autonomous vehicle and the passenger. For example, the vehicle may obtain the passenger secret and the secret key from different sources (e.g., the security server and the user device, respectively), and the passenger may not be authenticated if any one of the passenger secret and the secret key is not correct. Thus, an imposter would not be authenticated if the imposter could not obtain both the right passenger secret and the corresponding secret key before any one of them expires. In addition, by using the passenger biometric information, rather than merely relying on a user device (e.g., a smartphone, which may be stolen or found by a person other than the owner of the user device) that may have the right passenger secret and secret key, to authenticate the passenger that has requested the autonomous vehicle, the vehicle may be better protected against imposters. In other words, the passenger authentication may include authenticating both the user device used by a passenger and the passenger. Furthermore, a user may also verify that the vehicle is indeed the requested vehicle or a vehicle from the desired service provider, rather than a vehicle that may have been stolen, hacked, hijacked, or otherwise compromised (e.g., being modified). Therefore, the techniques may also reduce safety and security issues caused by, for example, vehicles being compromised or vehicle being owned or operated by malicious people, and the like, thus improving passenger safety and experience.

In some embodiments, techniques disclosed herein may be used to authenticate an vehicle other than an autonomous vehicle and/or to authenticate a passenger of a vehicle that may not be an autonomous vehicle. For example, the techniques may be used for authentication of a user and/or a vehicle (or another object, such as a package) when the user is picking up an unattended vehicle (or object) from, for example, a car rental service provider without the presence of customer service personnel.

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

People may need transportation service to travel locally or around the world. Transportation as a service or mobility as a service may be provided by transportation service providers, such as organizations (e.g., taxi companies) or individual drivers in the shared economy. For example, a passenger may use an app on a mobile device (e.g., a smart phone) to request transportation service through a transportation service platform. Drivers affiliated with the transportation service platform may then be dispatched to provide the requested service based on, for example, the passenger request and availability and locations of the drivers.

FIG. 1A illustrates an example of an environment for providing transportation service. As shown, a transportation service platform 110 may provide the connection between a passenger and a driver through mobile communication devices, such as smart phones. The passenger and the driver may be registered with the transportation service platform as a passenger, a service provider (e.g., a driver), or both. A user device 120 used by a passenger may have an application installed or may use a browser to request transportation service through transportation service platform 110. A driver that may become available within a reasonable period of time and/or may be at the vicinity of the passenger may be dispatched to provide the requested service. The passenger may receive a confirmation with information about the vehicle and/or the driver dispatched. When a vehicle 130 arrives, the passenger and the driver may communicate with each other face-to-face to make sure that the passenger and the driver (or the vehicle) are the right ones, and the passenger may then ride on the vehicle.

Autonomous vehicles that may be able to operate and travel autonomously without a human driver have started to be developed. The capability of the autonomous vehicles may help to reduce the cost of transportation (e.g., because no human driver is used), improve the safety of transportation (e.g., due to fewer reckless drivers or driver under the influence of alcohol or drug), reduce the number of cars needed (e.g., because fewer cars may be idle), reduce congestion (e.g., with less accident on the roads and/or less cars on the road), and reduce parking space needed as the autonomous vehicles may not need to stay at any destination.

Figure 1B:
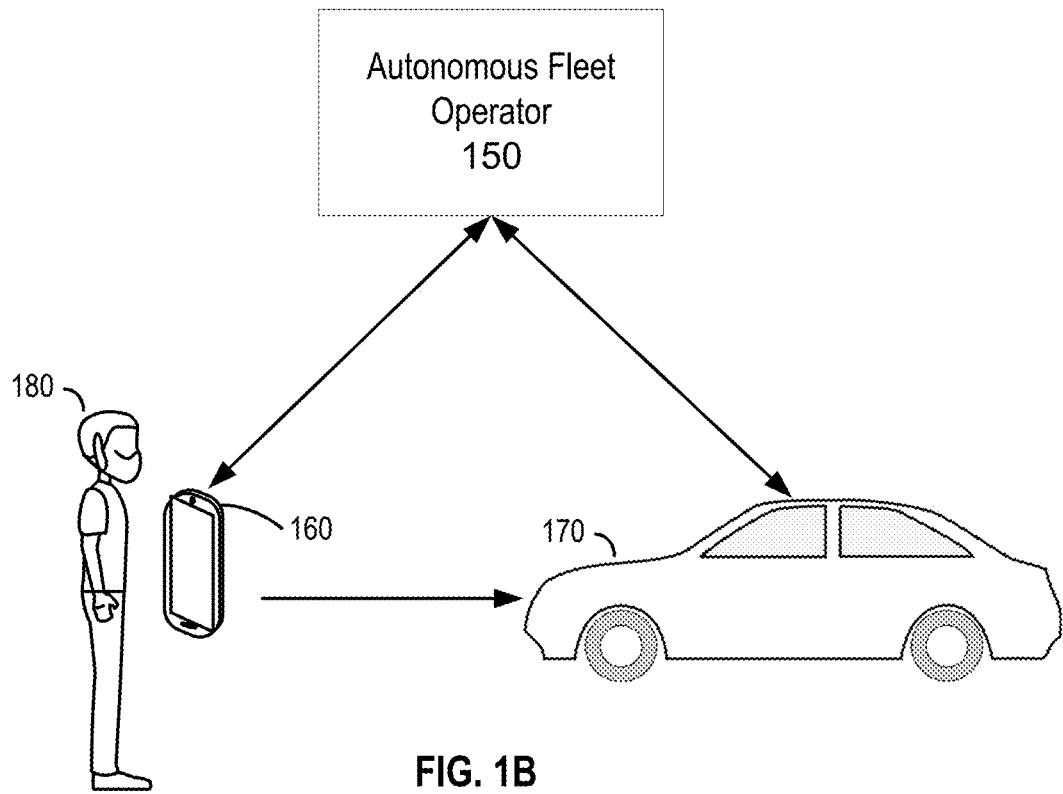
FIG. 1B illustrates an example of an environment for providing transportation service using an autonomous vehicle.

FIG. 1B illustrates an example of an environment for providing transportation service using an autonomous vehicle. Similar to the environment for providing the transportation service described in FIG. 1A, a transportation service platform or an autonomous fleet operator 150 may provide the connection between a passenger and an autonomous vehicle with wireless communication devices, such as a smart phone or a communication subsystem in an autonomous vehicle. For example, a user device 160 used by a passenger 180 may have an application installed or may use a browser to request transportation service through transportation service platform or the autonomous fleet operator 150. An autonomous vehicle that may become available within a reasonable amount of time and/or may be at the vicinity of the passenger may be dispatched to provide the requested service. The passenger may receive a confirmation with information about the autonomous vehicle. When an autonomous vehicle 170 arrives, it may receive information from the user device to verify that the user device is the device identified in the request or used for the request, and may then unlock the door to grant the access to the internal of the autonomous vehicle. Because there is no driver in the autonomous vehicle, no in-person communication may occur to make sure that the passenger and the vehicle are the right ones.

There may be many challenges to autonomous driving and to proving transportation service using autonomous vehicle, such as, for example, cyber security issues, vehicle safety issues, passenger safety issues, attacks or damages to unattended autonomous vehicles, the ability to react in conditions that the vehicle may not have experienced before and thus may not know how to react using machine-learning based decision-making techniques. These challenges are generally addressed individually in existing techniques.

Figure 2:
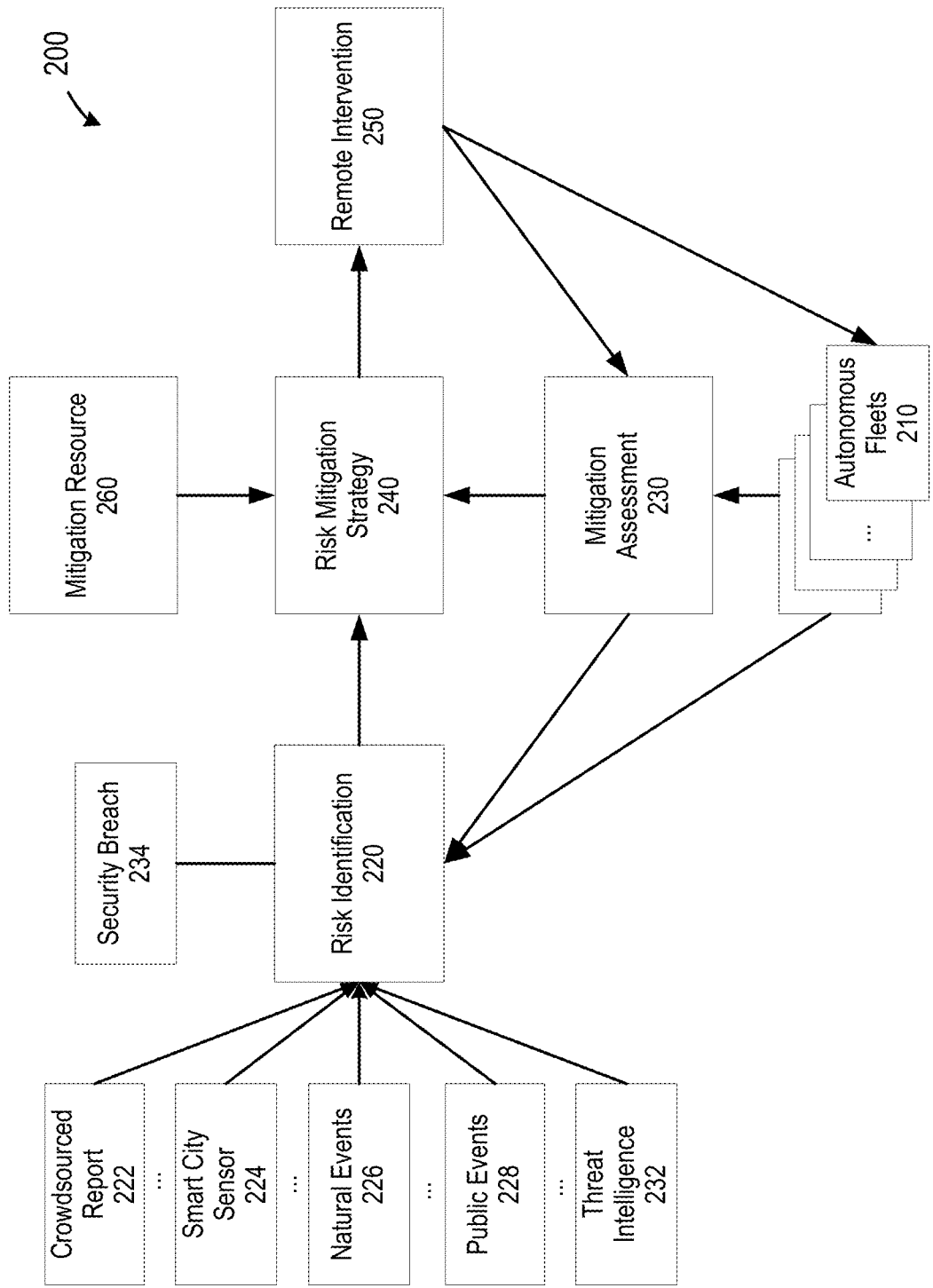
FIG. 2 illustrates an example of a risk mitigation system for autonomous vehicles according to certain embodiments.

FIG. 2 illustrates an example of a risk mitigation system 200 for autonomous vehicles according to certain embodiments. Risk mitigation system 200 may be used to mitigate various risk factors or conditions for autonomous fleets 210, such as, for example, (1) the interaction of cyber security threats with safety threats that can cause exposure of sensitive data belonging to a passenger as well as physical harm to the passenger such as injury or death; (2) the introduction of machine learning techniques and artificial intelligence that may make "black box" decisions which are yet imperfect and can have fatal consequences; and (3) the failure on the part of the autonomous fleet that may cause severe damages to not only the passengers and cargo in vehicles but also the property surrounding the vehicles. Risk mitigation system 200 may be used to predict, detect, and mitigate these threatening conditions to ensure the safety and security of people, property, and the environment in a shared autonomous fleet ecosystem. Risk mitigation system 200 may allow different techniques and solutions to be incorporated at any stage.

As illustrated, various sources of information, such as crowdsourced reports 222, smart city sensor results 224, natural events 226, public events 228, threat intelligence 232, and security breach information 234, and the like, may be provided to a risk identification engine 220 for identifying various risk conditions. In many cases, autonomous vehicles may also be equipped with mechanisms to detect various risk conditions or conditions requiring remote assistance, such as having a flat tire or getting stuck at a sign unknown to the vehicle. Crowdsourced reports 222 may include safety and security impacting events seen by anyone at the scene, including the autonomous vehicles. Smart city sensor results 224 may include all information available from fixed or mobile sensors and detectors by local authorities as part of the smart city infrastructure. Natural events 226 may include hazardous weather conditions, such as snow, hails, flood, and the like. Public events 228 may include planned public events, such as celebration, or unpredictable public events, such as traffic accidents, which may impact traffic congestion and safety. Threat intelligence 232 may include any intelligence data pertaining to criminal, terrorist, or other hostile actions that could impact the safety and security of the autonomous fleet. Security breach information 234 may include reports of security breaches to servers, individual devices, or any databases that may compromise the integrity of the autonomous driving and cause safety, privacy, or security issues. It should be noted that there can be other sources of information, and the various sources of information may be collected or measured using various sensor devices and techniques. These sensor devices can be distributed among different physical locations, and can be mobile or stationary. Their measurement results may be shared through networks.

Based on these sources of information, risk identification engine 220 may detect, extract, identify, or correlate information to determine the risk conditions. Additional information regarding the type, the severity, the physical locations, and the temporal information of the risks, and the like may be extracted or determined based on the sources of information. The information collected and generated by risk identification engine 220 may be sent to a risk mitigation strategy engine 240.

Risk mitigation strategy engine 240 may use the data provided by risk identification engine 220 to determine the mitigation actions to take and available mitigation resources 260 that can be used to mitigate the risks. For example, in some cases, risk mitigation strategy engine 240 may determine that remote intervention operations 250 may be needed to mitigate the identified risk. Remote intervention operations 250 may then implement the mitigation actions determined by risk mitigation strategy engine 240 to resolve the risk situation. Remote intervention operations 250 may be performed using multiple remote resources or local resources in the autonomous vehicles in autonomous fleets 210.

A mitigation assessment system 230 may gather information from autonomous fleets 210 and the environment for evaluating the effectiveness of the mitigation actions performed by remote intervention operations 250. Mitigation assessment system 230 may determine if any risks still exist and send the corresponding risk information to risk identification engine 220 and/or risk mitigation strategy engine 240 for determining if any additional actions can be taken to further mitigate the risks. For example, mitigation assessment system 230 may determine the mitigation effectiveness, the time for the mitigation of a risk condition, and the like.

The functions and operations described above can be performed on different computing platforms, at different locations, such as at a data center or in a cloud, based on the specific operations to be performed. For example, risk identification engine 220 can be in an autonomous vehicle, in a centralized server, or distributed among autonomous vehicles and/or remote servers.

In some embodiments, risk conditions may be characterized or represented by a set of attributes or vectors (e.g., feature vectors) to facilitate the risk mitigation and quantitative management. The risk mitigation may continue to improve and continue to mitigate the risk conditions for autonomous fleet 210. In some embodiments, statistics, such as the mitigation effectiveness, average time for the mitigation of a risk condition, the mitigation rate, and the like may be determined by risk mitigation system 200, such as mitigation assessment system 230 and/or risk identification engine 220.

Figure 3:
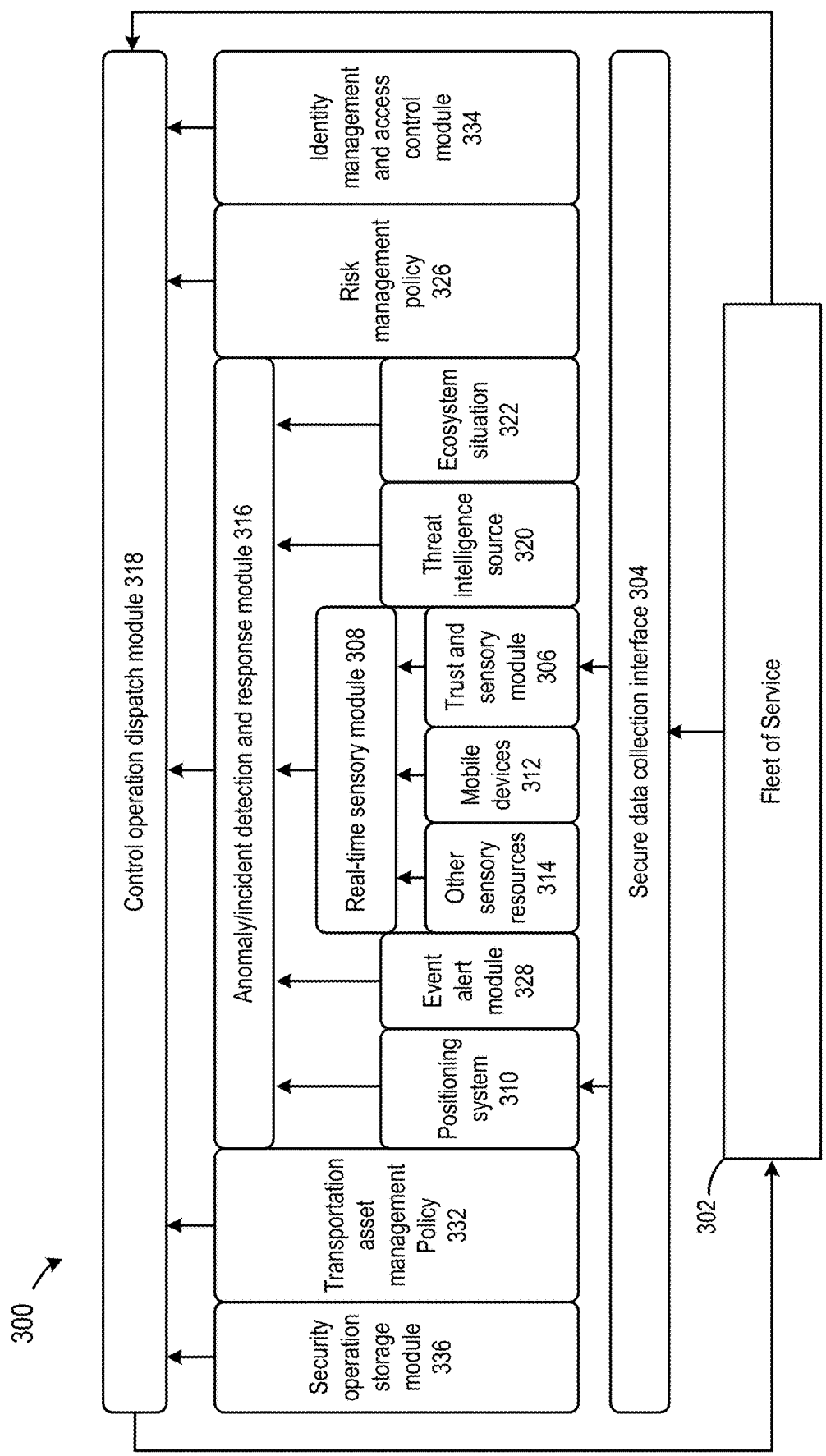
FIG. 3 illustrates an example of a security and safety platform for operating autonomous vehicles according to certain embodiments.

FIG. 3 illustrates an example of a security and safety platform 300 for operating autonomous vehicles according to certain embodiments. Security and safety platform 300 may be a specific implementation of at least some operations of risk mitigation system 200. Security and safety platform 300 can manage the security and safety of a fleet of vehicles, including fleet of vehicles 302. Security and safety platform 300 can collect various operation data of fleet of vehicles 302, as well as environment data from other sources related to an environment in which the fleet of vehicles operate. Security and safety platform 300 can process the data to detect and respond to incidents/anomalies, and determine a corresponding risk scenario. Security and safety platform 300 can then determine one or more control operations based on the risk scenario. Security and safety platform 300 can also take into account other information such as management policies, pre-configured security operations, access control rules, etc., to formulate the control operations. Security and safety platform 300 can then dispatch instructions to fleet of vehicles 302 to perform the control operations to mitigate the risk. Fleet of vehicles 302 can include various types of vehicles operating in different operation environments and providing different services. For example, fleet of vehicles 302 can include vehicles that provide private transportation, public transportation, ride-sharing, etc. Fleet of vehicles 302 can include autonomous driving (AD) vehicles, manually-driven vehicles, etc.

Security and safety platform 300 can further include a secure data collection interface 304 to collect various operation data from fleet of vehicles 302. The operation data may include, for example, location data, speed data, sensor data (e.g., sensor data from a cabin door sensor, a hood sensor, tire pressure sensors, etc.), status data from various electronic components of the vehicles, etc. To protect privacy and to avoid the operation data from being intercepted, secure data collection interface 304 can establish a secure wireless channel with each vehicle of the fleet, and receive, in real-time, the operation data from the vehicles via the secure wireless channels. Security and safety platform 300 further includes a trust and sensory module 306 which can provide the credential information (e.g., public key certificate, etc.) to perform mutual authentication with fleet of vehicles 302 to authenticate security and safety platform 300 and to establish the secure wireless channels with secure data collection interface 304. Trust and sensory module 306 can also perform certain post-processing operations on the real-time operation data, such as identifying the vehicles and the sensors that provide the sensor data, extracting the time information, etc., from the real-time operation data, and provide the post-processed real-time operation data to a real-time sensory module 308. The location and speed data from secure data collection interface 304 can also be processed by positioning system 310 to generate and/or update position information of each vehicle of fleet of vehicles 302. As to be described below, the position information of the vehicles can be correlated with other aspects of the real-time operation data provided by the vehicle to detect safety and/or security risks.

In addition to the real-time operation data from fleet of vehicles 302 (provided by trust and sensory module 306), real-time sensory module 308 can also obtain real-time environment data related to the environment(s) in which the fleet of vehicles operate in. As shown in FIG. 3, the real-time environment data can be obtained from mobile devices 312 and other sensory resources 314, among others. The real-time environment data may include, for example, reports provided by mobile devices 312, which can be operated by the passengers of fleet of vehicles 302, other road users, pedestrians, repair service personnel, etc. The reports may include, for example, traffic condition reports, road condition reports (e.g., whether a road is closed or otherwise not suitable for driving), etc. Mobile devices 312 can also transmit access requests to access certain features and resources of fleet of vehicles 302 by the passengers, the repair service personnel, etc. In addition, other sensory resources 314 may include fixed and/or mobile sensors installed as part of a city infrastructure to provide environment sensory data including, for example, weather conditions, traffic conditions, etc. Real-time sensory module 308 can provide the real-time environment data (e.g., reports from mobile devices 312, environment sensory data from other sensory resources 314, etc.) as well as the real-time operation data (from trust and sensory module 306) to anomaly/incident detection and response module 316, which may also be configured to receive position information of fleet of vehicles 302 from positioning system 310. In some embodiments, real-time sensory module 308 can be configured to receive real time data, the real-time environment data, and the real-time operation data (including the position information) to detect safety and/or security risks.

In addition to real-time environment data and real-time operation data, anomaly/incident detection and response module 316 can receive additional information/data from other sources to perform safety and/or security risks detection, and to provide response. For example, anomaly/incident detection and response module 316 can receive alerts/reports about certain public events (which can pre-planned, or based on real-time reporting, such as hazardous weather conditions, traffic accidents, etc.) at different locations and times from event alert module 328, and provide a response. Anomaly/incident detection and response module 316 can also monitor network activities and detect potential cyber security attacks. Anomaly/incident detection and response module 316 can also receive, from threat intelligence source 320, warnings of potential security threats, such as potential criminal, terrorist, or other hostile actions, at different locations and times. In addition, ecosystem situation 322 may also provide, for example, environment and operation data from other fleets of vehicles operated by other vendors. All these data can be integrated by anomaly/incident detection and response module 316 to perform safety and/or security risks detection.

Anomaly/incident detection and response module 316 can include logic to analyze the real-time environment data and real-time operation data (from real-time sensory module 308), position information of fleet of vehicles 302 (from positioning system 310), public events alerts/reports (from event alert module 328), warnings of potential security threats (from threat intelligence source 320), and ecosystem data (from ecosystem situation 322), and identify potential safety and/or security risks. The analysis can be based on, for example, correlating operation data with time and location information of fleet of vehicles 302, detecting patterns of operations, etc., while taking into consideration warnings and alerts about known events and threats. Anomaly/incident detection and response module 316 can also generate a risk assessment including, for example, an identification of the safety and/or security risk, time and location of the risk, severity of the risk, etc., and send the result of the analysis to control operation dispatch module 318.

As an illustrative example, real-time sensory module 308 may receive sensor data from a vehicle of fleet of vehicles 302. The sensor data may be generated by a sensor at a vehicle compartment which houses the electronic control unit (ECU) of the vehicle. Anomaly/incident detection and response module 316 may receive the sensor data from real-time sensory module 308, and determine that there is a current (or at a certain pre-determined time) attempt to access the vehicle compartment. Anomaly/incident detection and response module 316 may determine whether such an event indicates a potential security or safety risk. To make the determination, anomaly/incident detection and response module 316 may obtain additional data from other sources, such as positioning system 310, threat intelligence source 320, etc., as well as login data and access request provided by users who try to access vehicles 302, and correlate the additional data with the event. For example, anomaly/incident detection and response module 316 may determine, based on position information of the vehicle from positioning system 310, whether the vehicle is at a location where the compartment door is not expected to be opened. If the position information indicates that vehicle is at a repair shop, at the vehicle owner's premise, etc., at the time when the attempt to access the compartment door is detected, and a temporary access request to a vehicle compartment is received, anomaly/incident detection and response module 316 may determine that the attempted access does not pose a security risk and may grant access to the vehicle compartment. As another example, if the information provided by threat intelligence source 320, together with the position information from positioning system 310, indicate that the vehicle is located in an area where car theft is rampant, and an access attempt from a user who has no access right to the vehicle compartment is detected, anomaly/incident detection and response module 316 may determine that the attempted access poses a heightened security risk and can provide an appropriate response (e.g., by disabling the access to the vehicle compartment, by issuing an alert to law enforcement, etc.).

Control operation dispatch module 318 can receive the risk assessment (e.g., the identified risk, a severity of the risk, etc.) for a vehicle from anomaly/incident detection and response module 316, and determine an action to be performed at the vehicle to mitigate a safety/security risk based on the risk assessment. The determination can be based on applying a set of rules to the identified risk and the severity of the risk, and the rules can come from various sources. For example, as shown in FIG. 3, control operation dispatch module 318 can receive rules defined in risk management policy storage 326 and transportation asset management policy storage 332, and apply the rules to determine the action. Referring back to the vehicle compartment access example above, transportation asset management policy storage 332 may provide rules that specify that the compartment of a vehicle stores critical electronic components, and authorization is needed before granting access to the compartment. Risk management policy storage 326 can define a set of operations to determine whether to authorize access to the compartment (e.g., requesting credential information from the requester). For example, in a case where the requester for the vehicle compartment access is a registered user (e.g., a driver, a passenger, etc.) of fleet of vehicles 302, control operation dispatch module 318 can operate with an identity management and access control module 334 to authenticate the identity of the requester, and to determine the access right of the requester with respect to the vehicle compartment. In cases where anomaly/incident detection and response module 316 determines that the severity of a risk is high, control operation dispatch module 318 can perform security operations based on definitions stored in an security operation storage 336 to mitigate the security risk. For example, threat intelligence source 320 may indicate that there is high likelihood that the entire fleet of vehicles 302 may be under cyberattack. Security operations storage 336 may define that control operation dispatch module 318 should disable passengers' access to the Internet for each vehicle of the fleet (while maintaining the network connection between the vehicles and security and safety platform 300) when the risk of cyberattack is high. Control operation dispatch module 318 can then configure (or send instructions to) fleet of vehicles 302 to disable Internet access by the passengers.

Figure 4:
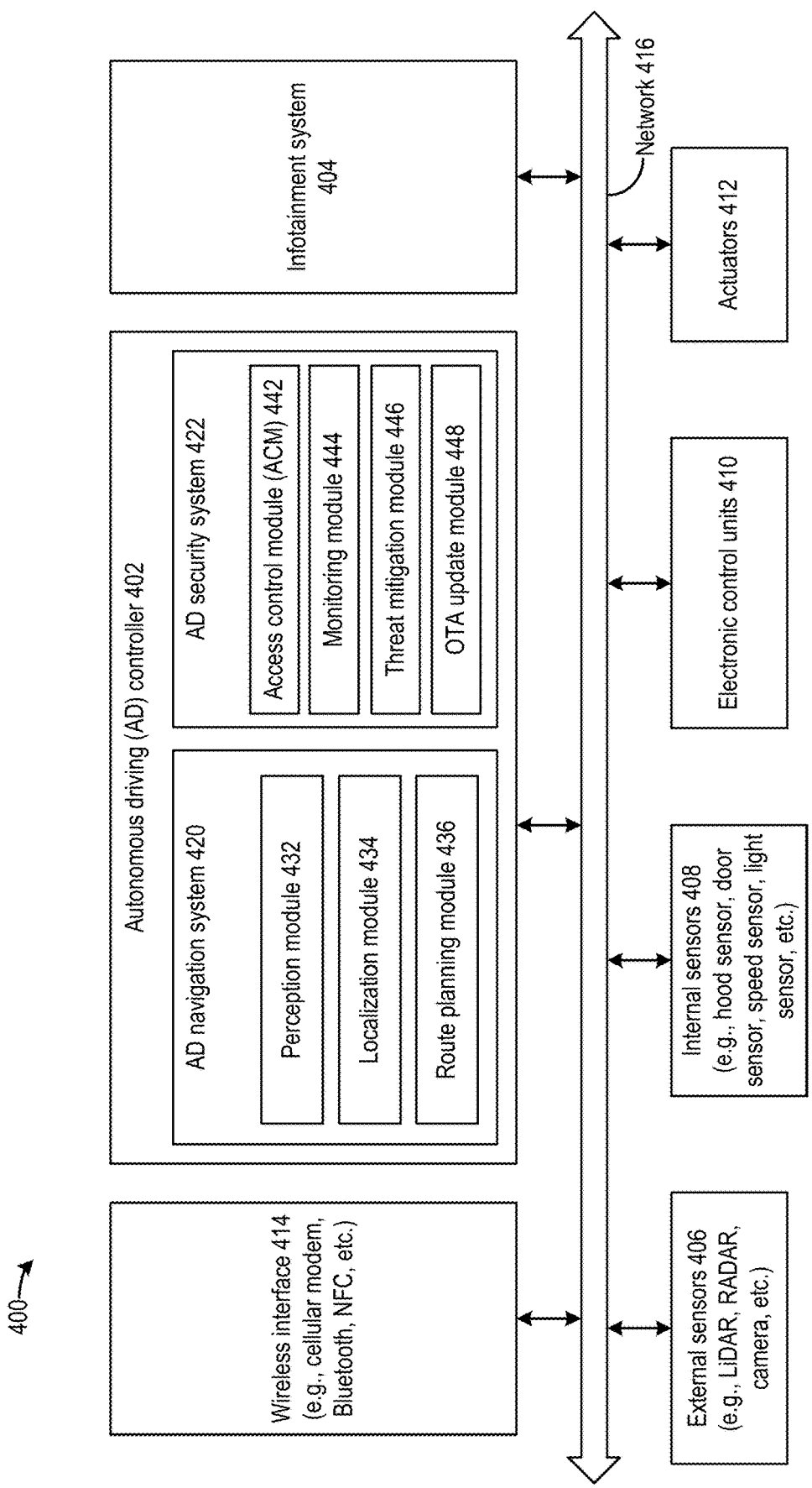
FIG. 4 is a simplified block diagram illustrating an example of a vehicle electronic system for implementing some techniques disclosed herein according to certain embodiments.

FIG. 4 is a simplified block diagram illustrating an example of a vehicle electronic system 400 for implementing some techniques disclosed herein according to certain embodiments. Vehicle electronic system 400 can be part of security and safety platform 300 of FIG. 3. Vehicle electronic system 400 can also be part of an autonomous driving (AD) vehicle and can include various electronic components including, for example, an AD controller 402, an infotainment system 404, external sensors 406, internal sensors 408, a plurality of electronic control units (ECUs) 410, a plurality of actuators 412, and a wireless interface 414. The electronic components are coupled to network 416. Via network 416, the electronic components can communicate with each other. In some examples, network 416 can include a CAN bus. In some examples, some of the components can also be connected directly, rather than via network 416. For example, external sensors 406, internal sensors 408, and actuators 412 may be directly connected to AD controller 402, such that AD controller 402 can detect and control unauthorized access to the vehicle even when network 416 is not working.

AD controller 402 can include components to support various operations related to autonomous driving including, for example, navigation and control, security and protection, etc. In some embodiments, the modules and subsystems of AD controller 402 can be implemented in the form of software instructions executable on a general purpose computer. In some embodiments, the modules and subsystems of AD controller 402 can be implemented on an integrated circuit (IC) such as Application Specific Integrated Circuit (ASIC), field-programmable gate array (FPGA), System-on-Chip (SoC), etc. In some embodiments, AD controller 402 can include AD navigation subsystem 420 and AD security subsystem 422. AD navigation subsystem 420 can obtain sensor data from external sensors 406 which may include, for example, LiDAR data, RADAR data, camera image data, etc., perform navigation operations based on the sensor data, and control the speed and the steering of the vehicle to bring the vehicle to a destination. As shown in FIG. 4, AD navigation subsystem 420 can include a perception module 432, a localization module 434, and a planning module 436. Perception module 432 can analyze the sensor data from external sensors 406 to generate perception data about an environment the vehicle is operating in to determine a location of the vehicle. For example, perception module 432 can analyze the LiDAR and RADAR data to determine, for example, a distance between obstacles (e.g., landmarks, buildings, etc.) and the vehicle. Perception module 432 can also analyze the image data from the cameras to extract, for examples, images of landmarks, buildings, etc. Localization module 434 can obtain the perception data from perception module 432 and determine, for example, a direction of travel of the vehicle, a location of the vehicle, etc. For example, localization module 434 can store a set of locations of landmarks within a locale. Localization module 434 can determine a current position of the vehicle within the locale based on a landmark identified from the image data, as well as distance from the identified landmark based on the LiDAR and/or RADAR data. Planning module 436 can determine one or more control decisions of the vehicle (e.g., a direction of travel of the vehicle, a speed of the vehicle, etc.) based on the current position of the vehicle and a destination of the vehicle. Planning module 436 can transmit control signals via network 416 to electronic control units 410 to control the steer angle of the vehicle, the throttle of the engine of the vehicle (to control its speed), etc., based on the control decisions. Planning module 436 can also transmit the control decisions to infotainment system 404 for output. For example, infotainment system 404 may provide navigation output (e.g., audio and/or video feedback) to the passengers to let them know the location of the vehicle and which direction the vehicle is heading.

In addition, AD security subsystem 422 can provide security and protection to the vehicle by regulating access to various features and functions of the vehicle and by performing operations to minimize security and safety threats. As shown in FIG. 4, AD security subsystem 422 can include an access control module (ACM) 442, a monitor module 444, a threat mitigation module 446, and an over-the-air (OTA) update module 448. ACM 442 can control access to various software and hardware components of the vehicle. For example, ACM 442 can regulate access to the passenger cabin, the vehicle compartments, etc., to regulate physical access to the vehicle. ACM 442 can also regulate access to software features and functions provided by other electronic components of the vehicle including, for example, infotainment system 404. For example, infotainment system 404 may provide access to certain content (e.g., entertainment, news, navigation information, etc.), and the access to those content can be restricted to certain privileged users/passengers. The access restriction can be enforced by ACM 442. As to be described in more details below, ACM 442 can communicate with a requester of the access and/or with a remote trusted platform (e.g., a management server) to authenticate the requester and to determine the access right of the requester.

In addition, monitoring module 444 can monitor the operation condition of the vehicle based on, for example, obtaining sensor data from external sensors 406 (e.g., LiDAR, RADAR, camera, etc.), sensor data from internal sensors 408 (e.g., hood sensor, door sensor, speed sensor, light sensor, etc.), user inputs to electronic components of the vehicle (e.g., infotainment system 404, ACM 442), etc. Threat mitigation module 446 can detect security and/or safety risks from the operation condition, and perform one or more operations to mitigate the security and/or safety risks. For example, threat mitigation module 446 can determine, based on the speed sensor data and LiDAR data, that there is a high risk that the vehicle will collide with an obstacle in its current trajectory, and can control ECUs 410 to automatically apply the brakes on the vehicle. As another example, threat mitigation module 446 can determine that an attempt to open the cabin door is detected based on ACM 442 and the passenger cabin door sensor data, and that the person seeking to open the cabin door is not authorized to access the cabin. In such situations, threat mitigation module 446 can control actuators 412 to, for example, lock the cabin door. OTA update module 448 can receive update information from a remote server (e.g., a management service server) to update, for example, rules and patterns for security/safety threat detection.

In addition, vehicle electronic system 400 can include wireless interface 414 to perform long-range and short-range communication to support safety and/or security management operations. For example, wireless interface 414 may include long-range communication interface, such as a cellular modem, to transmit operation data (e.g., collected by monitoring module 444) to a remote management server, and to receive instructions from the remote management server to enable or disable accesses to various components of the vehicle. As another example, wireless interface 414 may include a short-range communication interface, such as Bluetooth, Near Field Communication (NFC), etc., to receive an access request from a mobile device for accessing the software and/or hardware components of the vehicle (e.g., vehicle compartment, infotainment system 404, etc.), and forward to access request as well as credential information to ACM 442.

One main challenge in operating the autonomous fleets is the safety and security of people, vehicles, and other properties. For example, when no drivers are involved, the autonomous vehicles may need to be able to authenticate the passengers. In some solutions, each autonomous vehicle may be assigned a vehicle certificate during manufacture, which may later be provided to owner. Each user may be assigned a user certificate during user registration. Different entities may then verify each other using the certificates. This method may require the vehicle certificates and user certificates be securely stored. Should they be lost, leaked, or cloned, vehicles may be accessed by malicious users. Different access schemes may be needed for owners, friends, group members, and the like, which may make the overall process more complicate. In addition, the method may perform one-way authenticate between user devices and the vehicles. In other words, it may only authenticate a user device. Neither the autonomous vehicle nor the person that holds the user device is authenticated. This may cause safety and security issues for the vehicles and the passengers. For example, a passenger may enter a duplicitous vehicle or a person may use a stolen or lost user device to gain access to a vehicle using another person's identity and cause damages to the vehicle.

According to some embodiments, a mutual authentication technique that utilizes passenger biometric information, rather than merely relying on machine generated security codes, passwords, or tokens, may be used to authenticate both the autonomous vehicles and the passengers. The mutual authentication technique may help to solve safety and security issues caused by, for example, user devices being stolen or lost, vehicles and user devices being hacked, vehicles being owned or operated by malicious people, and the like.

Figure 5:
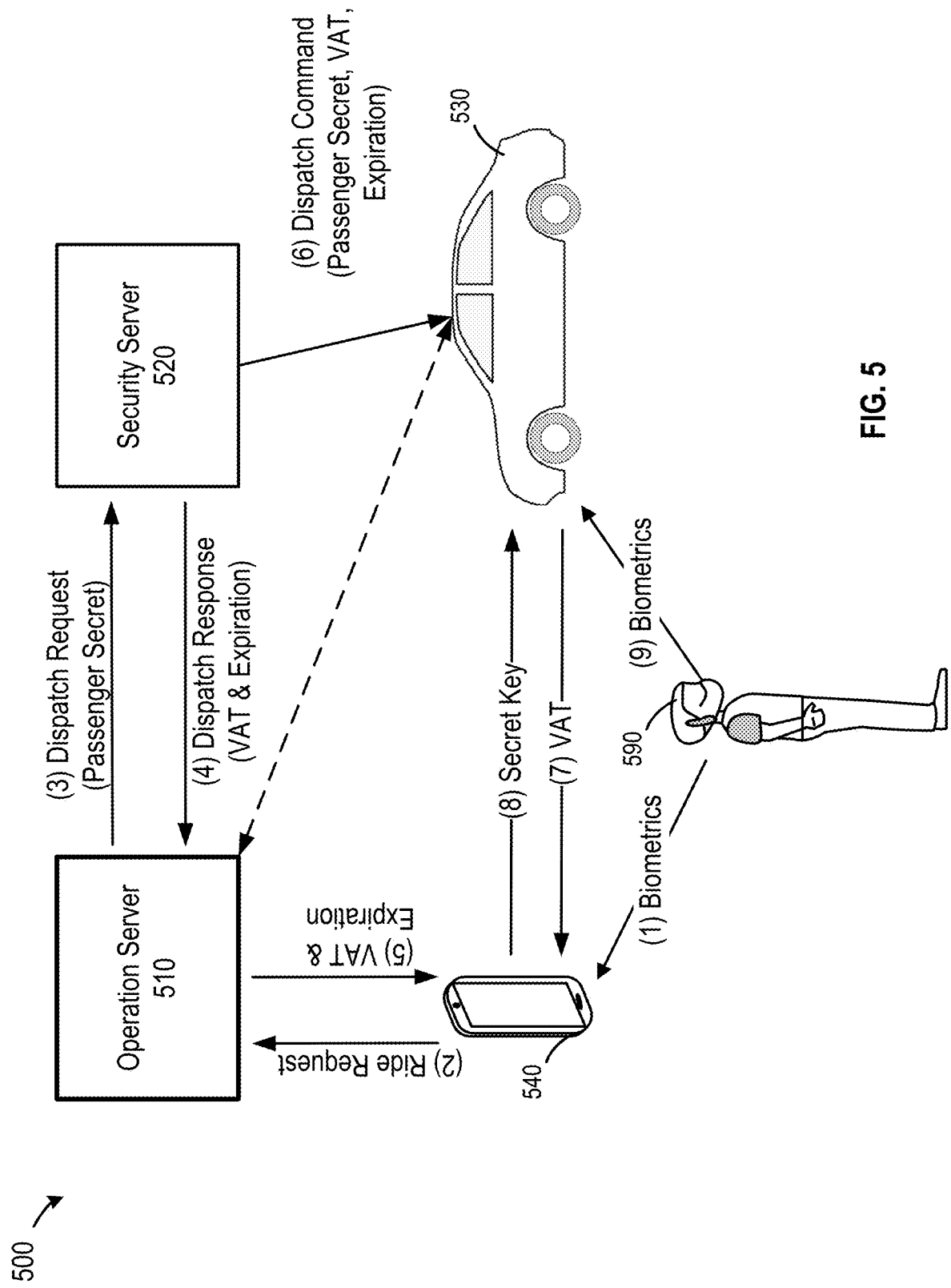
FIG. 5 is a simplified diagram illustrating an example of a system and a method for authenticating autonomous vehicles and passengers according to certain embodiments.

FIG. 5 is a simplified diagram 500 illustrating an example of a system and a method for authenticating autonomous vehicles and passengers according to certain embodiments. An autonomous fleet owner or service provider may maintain a transportation service platform, such as control operation dispatch module 318 described above. The transportation service platform may include an operation server 510 and a security server 520, where operation server 510 and a security server 520 may be in a same integrated system at a same physical location or, in most cases, may be separate systems at a same location or at different locations with secure connections between them, such as using secure wired links or buses through various firewalls and secure agents. Operation server 510 may manage user requests and select (or provide options for users to select) vehicles for providing the requested transportation services. Security server 520 may, together with user device, ensure the safety and security of the system as described in details below.

An autonomous vehicle 530 may include a vehicle electronic system as described above with respect to FIG. 4. Autonomous vehicle 530 may communicate wirelessly with security server 520 and/or operation server 510 through secure links. Autonomous vehicle 530 may also include various sensors (e.g., LIDARs and cameras) to collect information regarding the environment, the user devices, and the passengers. A user device 540 may include various sensors, such as cameras, touch sensors, RF sensors, and the like, to collect various passenger biometric information. User device 540 may also execute an app to request transportation service and to perform mutual authentication with autonomous vehicles 530 as described in details below.

As illustrated in FIG. 5, user device 540 may collect biometric information of passenger 590, such as fingerprints, iris patterns, voice spectra, facial features, and the like. For example, user device 540 may include cameras that can capture high quality images of the passenger's fingers, eyes, or face. User device 540 may also include a voice recorder to record an utterance by the passenger, such as a particular sentence. User device 540 may also include a touch sensor to capture the fingerprint of the passenger. User device 540 may collect any combination of such biometric information of the passenger.

User device 540 may then generate a secret key, and use the secret key to encrypt the passenger biometric information. The encrypted passenger biometric information may be referred to as a passenger secret. User device 540 may send the passenger secret and a ride request that may include information regarding the requested ride, such as the source address, destination address, the desire time frame, and the like, to operation server 510. In some embodiments, user device 540 may set an expiration time for the secret key or passenger secret, and send the expiration time in the ride request as well. User device 540 may invalidate or delete the secret key or the passenger secret after the expiration time.

Operation server 510 may select an autonomous vehicle for providing the ride based on the ride request, such as based on the location of the passenger, the destination address, the availability of autonomous vehicles, the current locations of the autonomous vehicles, and the like. The operation server may then send the identification of the selected vehicle, information regarding the requested service (e.g., source location, destination location, time of service, etc.), the passenger secret, and other information (e.g., expiration time of the passenger secret or secret key) in a dispatch request to security server 520.

Security server 520 may generate a vehicle access token (VAT), determine an expiration time for the VAT in the response to the dispatch request, and send the VAT and the expiration time back to operation server 510. The VAT may be for one-time use only. Security server 520 may also sent the passenger secret, the requested service (e.g., source location, destination location, time of service, etc.), the VAT, and the expiration time of the VAT to autonomous vehicle 530 based on the identification of the selected vehicle. In some embodiments, selected autonomous vehicle 530 may download such information from a secure store.

Operation server 510 may send the VAT and the expiration time of the VAT to the user device as a response to the ride request. The response may also include some descriptions of the selected autonomous vehicle, such as the model and make and the license number of the selected autonomous vehicle 530.

The selected autonomous vehicle 530 may arrive at the source location within a certain time period (e.g., within the expiration time of the VAT and/or the secret key or the passenger secret). User device 540 may read the VAT from autonomous vehicle 530 using, for example, NFC, RF reader, WiFi, WiMax, Bluetooth, ZigBee, or other communication technologies. User device 540 may then compare the VAT read from autonomous vehicle 530 and the VAT received from operation server 510. If the two VATs match, user device 540 may determine that autonomous vehicle 530 is the one dispatched by operation server 510 and/or security server 520.

After autonomous vehicle 530 is authenticated by user device 540, user device 540 may send the secret key that it has generated for the ride request to autonomous vehicle 530. Autonomous vehicle 530 may then collect passenger biometric information (e.g., fingerprints, iris patterns, voice spectra, facial features, and the like), decrypt the passenger secret using the secret key to generate expected passenger biometric information, and compare the collected passenger biometric information and the expected passenger biometric information to determine if the person requesting access to the vehicle is the passenger that has requested the transportation service. If the passenger is authenticated, autonomous vehicle 530 may unlock the door and give the passenger the access to the internal of the vehicle.

In some embodiments, the passenger secret may be saved at user device 540 and/or security server 520. Because the passenger secret is the result of an encryption and the passenger secret key is saved in each user device. Even if the passenger secret is leaked, it may not be used by an imposter to access a vehicle because the secret key is in user device 540 (and thus other devices may not have the secret key) and because biometric information is collected on-site to verify the passenger (and thus the biometric information of the imposter may not match the decrypted passenger biometric information of the actual requester even if the user device is lost or stolen or the secret key is leaked).

In some embodiments, any one of the secret key, passenger secret, and VAT may have an expiration time and may become invalid after the expiration time. In some embodiments, any one of the secret key, passenger secret, VAT, and biometric information of the passenger may expire immediately or may be removed from the user device, autonomous vehicle, operation server, or security server after the mutual authentication completes.

In some embodiments, the VAT and the passenger secret (or the secret key) may be renewed or regenerated if the transaction takes too long to complete, such as when autonomous vehicle 530 is stuck in traffic. For example, when autonomous vehicle 530 arrives after the expiration time, either user device 540 or autonomous vehicle 530 may send a request to renew or restart a mutual authentication process, such as generating a new secret key, a new passenger secret, and/or a new VAT and sending them to user device 540 or autonomous vehicle 530.

Figure 6:
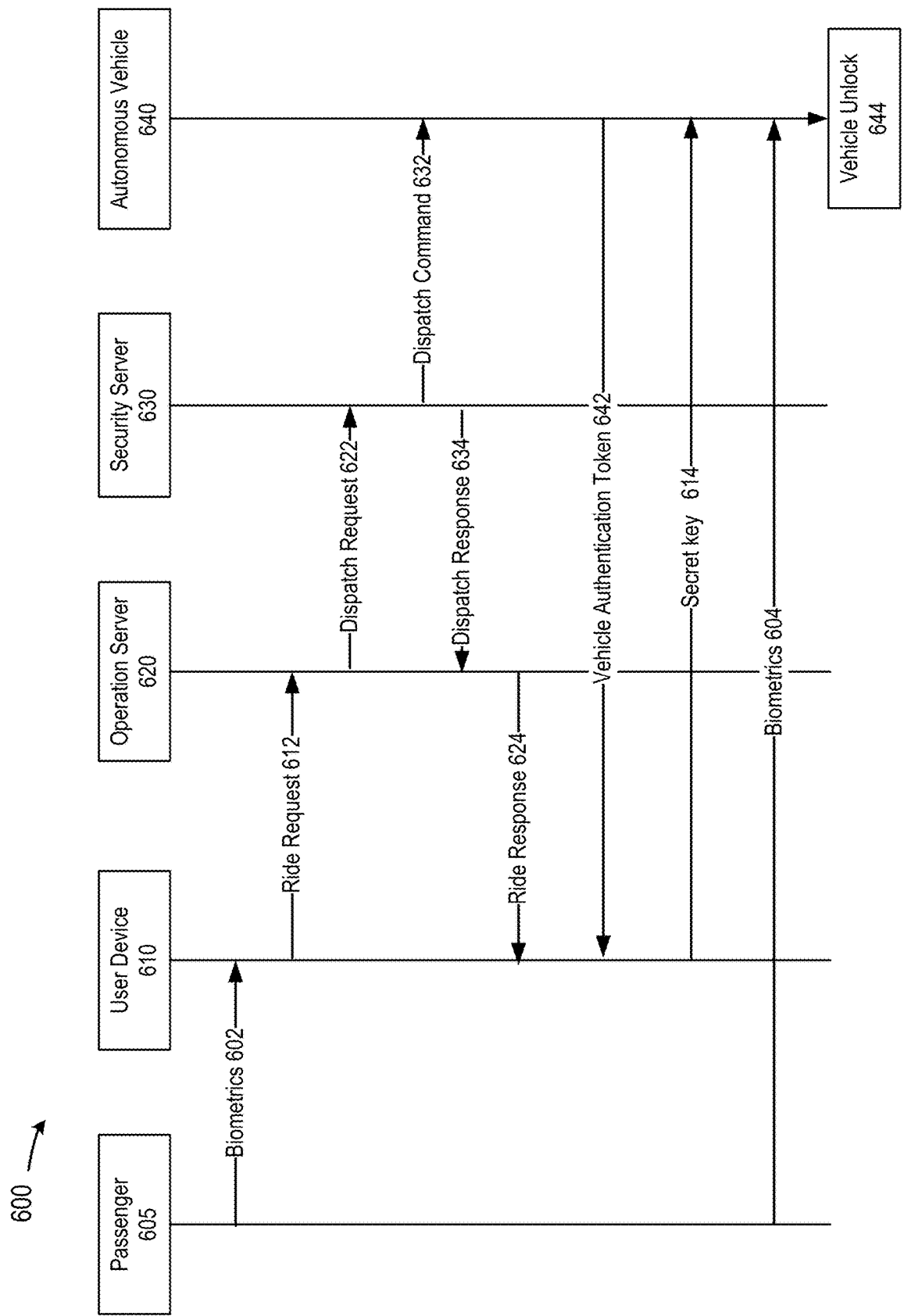
FIG. 6 is a simplified flow diagram illustrating an example of a method for mutual authentication of autonomous vehicles and passengers according to certain embodiments.

FIG. 6 is a simplified flow diagram 600 illustrating an example of a method for mutual authentication of autonomous vehicles and passengers according to certain embodiments. As illustrated, multiple entities may involve in the mutual authentication of autonomous vehicles and passengers. The entities may include, for example, a passenger 605, a user device 610, an operation server 620, a security server 630, and an autonomous vehicle 640.

User device 610 may collect passenger biometric information from passenger 605 at operation 602. As described above, passenger biometric information may include, for example, fingerprints, iris patterns, voice spectra, facial features, and the like. User device 610 may generate a secret key and encrypt the passenger biometric information into a passenger secret using the secret key. User device 610 may then send a ride request to operation server 620 at operation 612. The ride request may include the requested ride information (e.g., source, destination, time of ride, etc.) and the passenger secret. Operation server 620 may select a vehicle and send a dispatch request to security server 630 at operation 622. The dispatch request may include the ride request that includes the passenger secret and the ride information. Security server 630 may generated a VAT with an expiration time, such as an hour, which may be determined based on the commute time. Security server 630 may send the VAT and the expiration time in a dispatch command to autonomous vehicle 640 at operation 632 and send the VAT and the expiration time in a dispatch response to operation server 620 at operation 634. Operation server 620 may forward the VAT and the expiration time in a ride response to user device 610 at operation 624. In some embodiments, the ride response may also include the description of the selected autonomous vehicle, such as the model and make, the license plate, the current location, and the expected arrival time of the selected autonomous vehicle. In some embodiments, the passenger secret or the VAT may be provided to the selected autonomous vehicle 640 and user device 610 when autonomous vehicle 640 is about to arrive or after autonomous vehicle 640 has arrived at the source location, and the expiration time of the passenger secret or the VAT can be set to a shorter time period, such that a hacker may not have sufficient time to intercept and decipher the passenger secret or the VAT.

When autonomous vehicle 640 arrives at the source location, user device 610 may read the VAT from autonomous vehicle 640 at operation 642 and compare the VAT read from autonomous vehicle 640 with the VAT received from operation server 620. If the two VATs match and the VAT has not expired, autonomous vehicle 640 may be authenticated by user device 610. User device 610 may then send the secret key used to encrypt the passenger biometric information to autonomous vehicle 640 along with a request for passenger authentication at operation 614. Upon receiving the authentication request, autonomous vehicle 640 may collect passenger biometric information from passenger 605 at operation 604. For example, autonomous vehicle 640 may provide instructions (e.g., where to position fingers, eyes, or face or which sentence to read) to passenger 605 through user device 610 for collecting the passenger biometric information. Autonomous vehicle 640 may decrypted the passenger secret using the secret key received from user device 610, and compare the passenger biometric information recovered from the passenger secret with the passenger biometric information collected on-site. For example, autonomous vehicle 640 may perform an image comparison, an object classification, or a feature vector (e.g., audio spectra or spatial frequencies) extraction (e.g., Fourier transformation) and comparison. If a match is found, passenger 605 may be authenticated by autonomous vehicle 640, and autonomous vehicle 640 may unlock the doors at operation 644 to grant passenger 605 the access to the vehicle.

Figure 7:
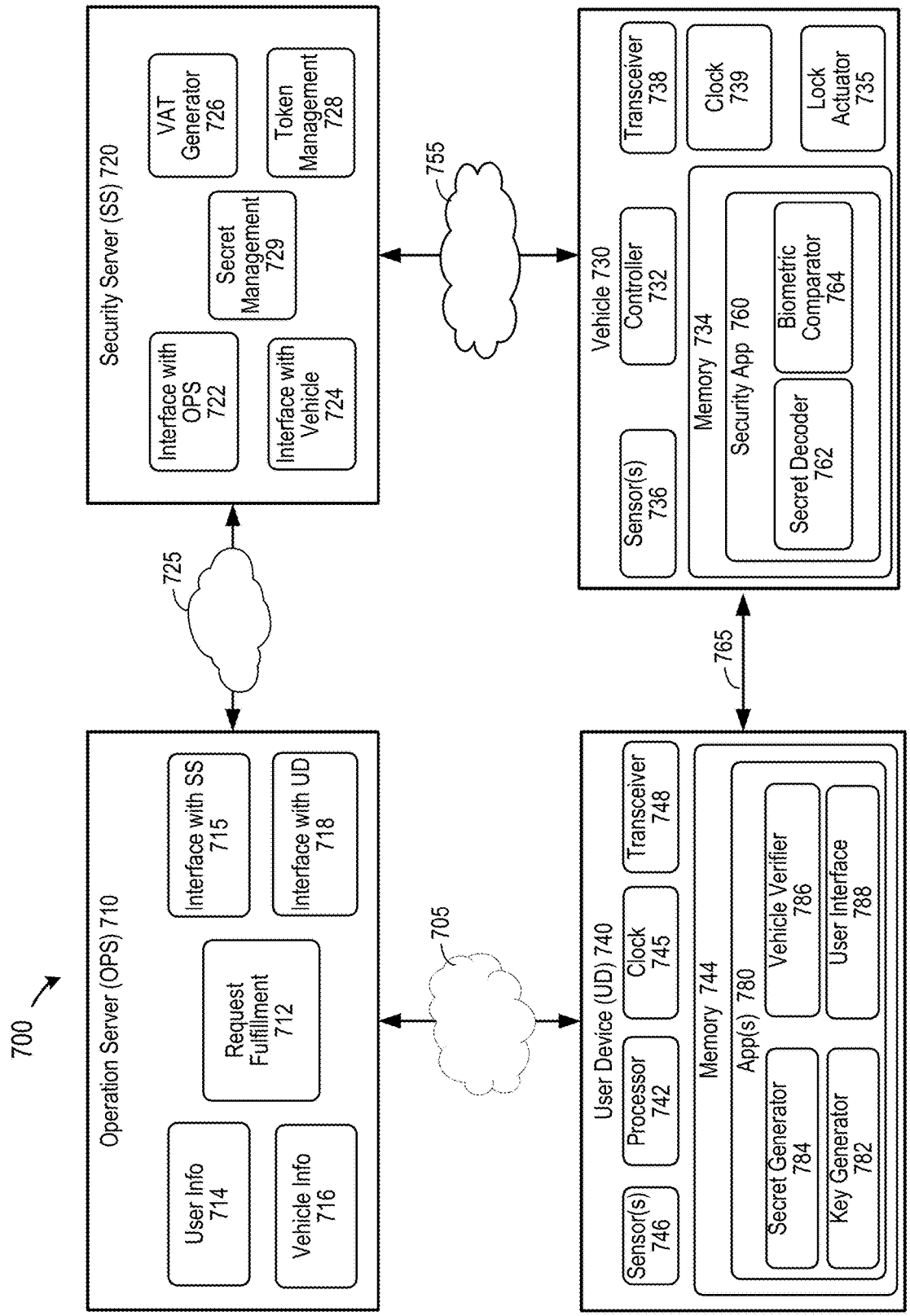
FIG. 7 is a simplified block diagram illustrating various functional devices and components in an example of a system for providing safe and secure transportation service using autonomous vehicles according to certain embodiments.

FIG. 7 is a simplified block diagram 700 illustrating various devices and components in an example of a system for providing safe and secure transportation service using autonomous vehicles according to certain embodiments. The system shown in FIG. 7 may include an operation server (OPS) 710, a security server 720, a vehicle 730, and a user device 740 that may be communicatively connected through, for example, wired or wireless networks 705, 725, and 755 and shorter distance wireless communication technologies, such as NFC, RF reader, WiFi, WiMax, Bluetooth, ZigBee, infrared light, and the like. The devices and components shown in FIG. 7 are just some examples of functional blocks that may be used to perform some operations described herein. The system may include other functional blocks to perform other functions described or not described in this application. In some embodiments, some functional blocks depicted in FIG. 7 may not be used for authentication.

Operation server 710 may include a data store for storing user information 714 for registered users, such as user profiles, payment methods, locations, contact information, and the like. Operation server 710 may also include a data store for storing vehicle information 716 for autonomous fleets. Vehicle information 716 may include, for example, vehicle identification number (VIN), configurations of the autonomous vehicles, the current statuses and locations of the autonomous vehicles, the ways to contact the autonomous vehicles, and the like. Operation server 710 may also include an interface 715 with security server 720, and an interface 718 with user device 740. For example, interface 718 with user device 740 may be an interface of the transportation service platform. Interface 715 with security server 720 may be an interface for secure network connections. Operation server 710 may include a request fulfillment engine 712 that may receive a ride request from interface 718, retrieve user information 714 and vehicle information 716 to select an appropriate vehicle or select multiple vehicles for the passenger to choose from, and send the information of the selected vehicle(s) to a passenger. The passenger may pick one vehicle if multiple vehicles are selected by request fulfillment engine 712. As described above, request fulfillment engine 712 may make the selection based on the ride request, and vehicle configurations and status (e.g., availability and current locations).

Security server 720 may include an interface 722 with operation server 710, and an interface 724 with vehicle(s) 730. Both interface 722 and interface 724 may be a secure network interface. Interface 722 may be used to receive dispatch requests from operation server 710 and to send dispatch responses to operation server 710. Interface 724 may be used to provide a dispatch command including the passenger secret, requested ride information, VAT, and expiration time to vehicle 730. As described above, in some embodiments, vehicle 730 may request and download the dispatch command from security server 720. Security server 720 may also include a VAT generator 726 that can generator VATs, where each VAT may be used for one time only and may expire after an expiration time period. The expiration time period may be determined based on, for example, estimated commute time for the selected vehicle to reach the passenger. Security server 720 may include a token management unit 728, which may store and keep track of active VATs for different ride requests, determine if a VAT has expired because the corresponding expiration time period has passed or if a transaction using the VAT has been completed, and then remove the expired VAT or set the expired VAT as invalid. Security server 720 may further include a secret management unit 729, which may store and keep track of active passenger secrets for different ride requests, determine if a passenger secret has expired because the corresponding expiration time period has passed or if a transaction using the passenger secret has been completed, and then remove the expired passenger secret or set the expired passenger secret as invalid.

Vehicle 730 may include, for example, a controller 732, one or more sensors 736, one or more transceivers 738, a memory system 734, a clock 739, and a lock actuator 735. Controller 732 may be used to control the operations of other components to perform the passenger and vehicle authentication as described herein. For example, controller 732 may control sensor(s) 736 to collect passenger biometric information, such as fingerprints, iris patterns, voice spectra, facial features, and the like, where sensor(s) 736 may include one or more cameras, touch sensors, microphones, and the like. Transceiver 738 may include any wireless communication transceiver, such as a NFC, RF reader, WiFi, WiMax, Bluetooth, ZigBee, 3G, 4G, or 5G wireless communication transceiver, for communication with security server 720 and user device 740. Clock 739 may be used to determine the time (e.g., expiration time) and synchronize electronic components on vehicle 730. Memory system 734 may include memory devices at different hierarchical levels, such as cache, ROM, DRAM, flash memory, solid state drive, hard drive, optical drive, or other volatile or non-volatile memory devices that may store data, software, firmware, etc. For example, memory system 734 may store a security application 760, which may be implemented as a software or firmware module and may be executed by controller 732. Security application 760 may include, for example, a secret decoder 762 configured to decrypt expected passenger secret using a secret key, and a biometric comparator 764 configured to compare expected decrypted passenger biometric information and passenger biometric information collected on-site by one or more sensor(s) 736. For example, as described above, biometric comparator 764 may perform an image comparison, an object classification, or an feature vector (e.g., audio spectra or spatial frequencies) extraction (e.g., Fourier transformation) and comparison.

User device 740 may include, for example, a processor 742, a memory system 744, one or more sensors 736, and one or more transceivers 748. Processor 742 may control operations of various components on user device 740. For example, processor 742 may request sensor(s) 746 to collect passenger biometric information, such as fingerprints, iris patterns, voice spectra, facial features, and the like, where sensor(s) 746 may include one or more cameras, touch sensors, microphones, and the like. Transceiver 748 may include any wireless communication transceiver, such as a NFC, RF reader, WiFi, WiMax, Bluetooth, ZigBee, 3G, 4G, or 5G wireless communication transceiver, for communication with operation server 710 and vehicle 730. Clock 745 may be used to determine the time (e.g., expiration time) and synchronize electronic components on user device 740. Memory system 744 may include memory devices at different hierarchical levels, such as cache, ROM, DRAM, flash memory, solid state drive, or other volatile or non-volatile memory devices that may store data, software, firmware, etc. For example, memory system 744 may store one or more applications 780, which may be implemented as a software or firmware module and may be executed by processor 742. The one or more applications 780 may include, for example, a key generator 782, a secret generator 784, a vehicle verifier 786, and a user interface 788. Key generator 782 may include, for example, some random number generators and some encoding blocks for generating a secret key (e.g., a polynomial or a matrix) to encrypt the passenger biometric information. Secret generator 784 may be configured to encrypt passenger biometric information to generate a passenger secret using a secret key. Vehicle verifier 786 may compare VATs received from operation server 710 and vehicle 730 to determine if the VATs match. User interface 788 may be used to provide an graphic user interface for the passenger to provide and receive information for the transaction, such as the ride request, information regarding the selected vehicle, and instructions for collecting biometric information, and the like.

Figure 8:
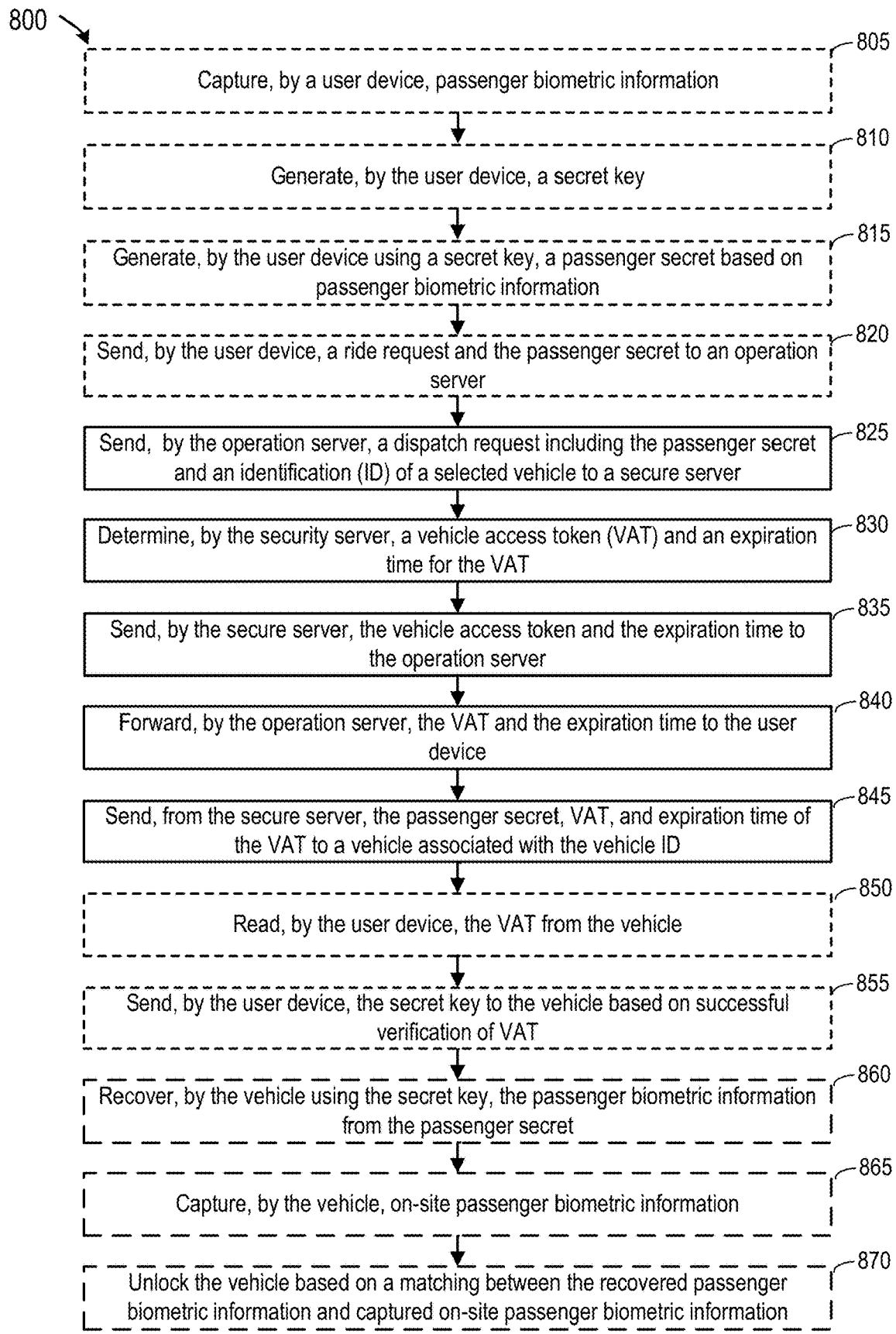
FIG. 8 is a simplified flow chart illustrating an example of a method for mutual authentication of autonomous vehicles and passengers according to certain embodiments.

FIG. 8 is a simplified flow chart 800 illustrating an example of a method for mutual authentication of autonomous vehicles and passengers according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In some embodiments, the processing described in FIG. 8 may be performed by a transportation service platform (including an operation server and a security server), an autonomous vehicle, and a user device as described above.

At block 805, a user device, such as a smart phone, may capture passenger biometric information of a user of the user device. For example, the user device may execute a user application, which may provide instructions for capturing the passenger biometric information to the user through a user interface of the user device. The passenger biometric information may include, for example, any combination of a fingerprint, an iris pattern, a voice spectrum, and a facial feature of the user. For example, the user device may include cameras that can capture high quality images of the passenger's fingers, eyes, or face. The user device may also include a voice recorder that may record an utterance by the passenger, such as a particular sentence. Additionally or alternatively, the user device may include a touch sensor that may capture the fingerprint of the passenger.

At block 810, the user device may execute the user application to generate a secret key. At block 815, the user device may execute the user application to generate a passenger secret based on the passenger biometric information and the secret key. For example, the user device may encrypt the passenger biometric information using the secret key. In some embodiments, the secret key and/or the passenger secret may each have a respective expiration time, after which the secret key or the passenger secret is no longer valid and would not be used to verify the user. At block 820, the user device may send a transportation service request (e.g., a ride request) and the passenger secret to a transportation service platform (e.g., an operation center of the transportation service platform). As described above, the transportation service request may include information regarding the requested ride, such as the source address, destination address, the desire time frame, the number of passengers, the desired type of vehicle, and the like.

At block 825, the operation server may select a vehicle in response to the transportation service request as described above with respect to FIGS. 5 and 6, and send a dispatch request including the passenger secret and an identification (ID) of the selected vehicle to a secure server of the transportation service platform. At block 830, the security server may determine a vehicle access token (VAT) for the selected vehicle. In some embodiments, the VAT may be for one-time use only. In some embodiments, the security server may determine an expiration time for the VAT. The VAT may be invalid after the expiration time and would not be used to verify the vehicle after the expiration time.

At block 835, the secure server may send the vehicle access token and the expiration time to the operation server. At block 840, the operation server may forward the VAT and the expiration time to the user device. At block 845, the secure server may send the passenger secret, the VAT, and the expiration time of the VAT to the selected vehicle associated with the vehicle ID.

At block 850, the user device may read the VAT from the vehicle after the vehicle arrives. As described above, the user device may read the VAT from the vehicle using, for example, NFC, RF reader, WiFi, WiMax, Bluetooth, Zig-Bee, or other communication technologies. In some embodiments, the user device may only read the VAT from the vehicle if the VAT has not expired. In some embodiments, if the VAT has expired, the user device may send a request to the transportation service platform to request for renewing the VAT or a new VAT.

At block 855, the user device may verify the VAT read from the vehicle by comparing the VAT read by the user device from the vehicle with the VAT sent to the user device from the operation center. If the VAT read from the vehicle matches the VAT sent to the user device from the operation center, the user device may determine that the vehicle is the vehicle selected by the transportation service platform for providing the requested service, and may then send the secret key to the vehicle. The secret key may be sent to the vehicle using, for example, NFC, RF reader, WiFi, WiMax, Bluetooth, ZigBee, or other communication technologies.

At block 860, the vehicle may recover (e.g., decrypt) the passenger biometric information from the passenger secret using the secret key. At block 865, the vehicle may capture on-site passenger biometric information from the user of the user device. For example, the vehicle may provide instructions to the user through the user interface of the user device for collecting the on-site biometric information of the user. At block 870, the vehicle may be unlocked if the recovered passenger biometric information and the captured on-site passenger biometric information of the user matches.

It is noted that even though FIG. 8 describes the operations as a sequential process, some of the operations may be performed in parallel or concurrently. An operation may have additional steps not included in the figure. Some operations may be optional, and thus may be omitted in various embodiments. Some operations described in one block may be performed together with operations described at another block. Some operations may be performed in different order.

Figure 9:
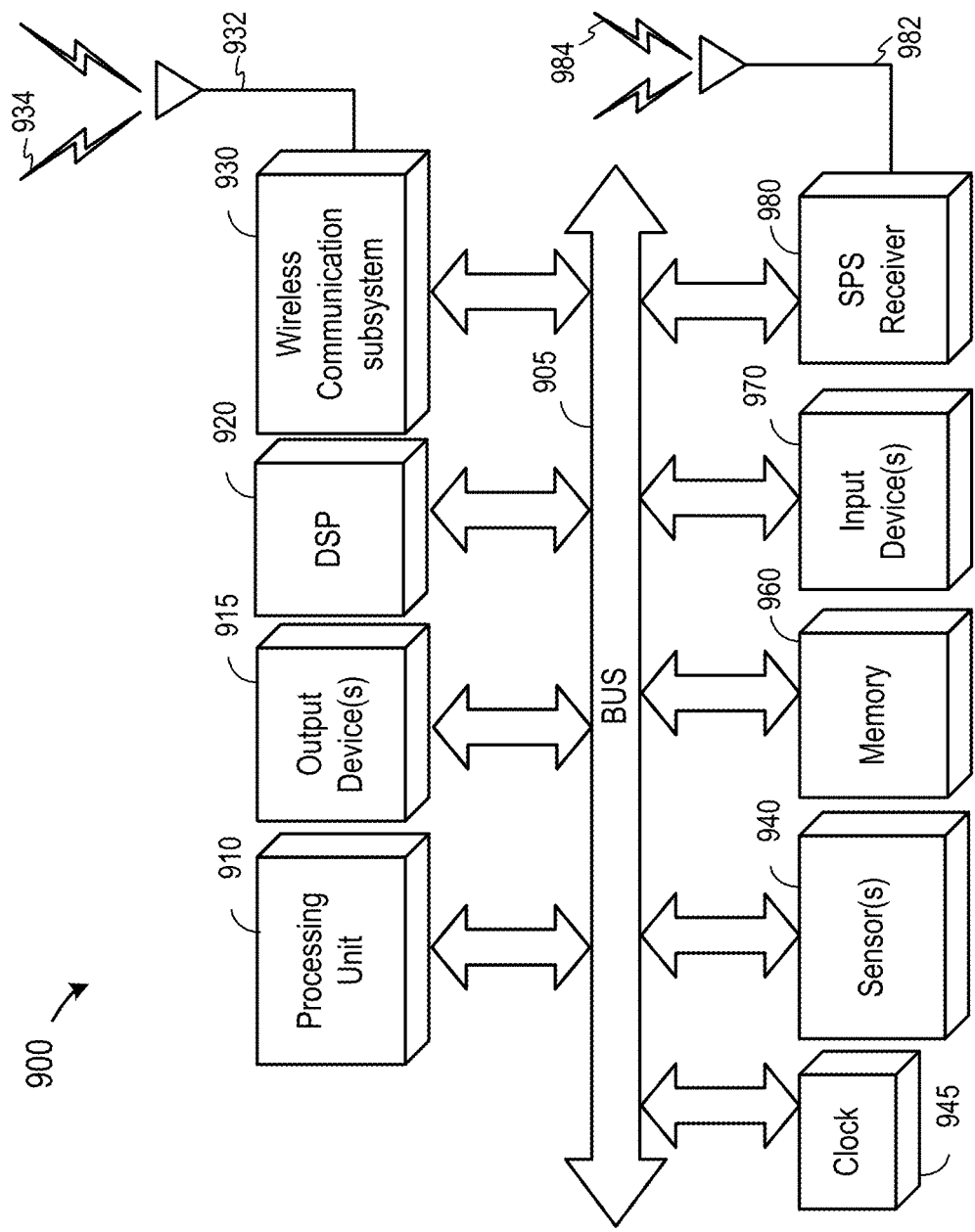
FIG. 9 is a simplified block diagram of an example of a user device for implementing some techniques disclosed herein according to certain embodiments.

FIG. 9 a simplified block diagram of an example of a mobile device 900, such as a wireless mobile device (e.g., a smart phone, a smart watch, a touch pad, etc.), for implementing some techniques disclosed herein according to certain embodiments. For example, mobile device 900 may be used as the user device or a device in a vehicle as described above. It should be noted that FIG. 9 is meant only to provide a generalized illustration of various components, any or all of which may be utilized as appropriate. In some embodiments, for example, mobile device 900 can be a cellular telephone or other mobile electronic device. As such, as previously indicated, components may vary from embodiment to embodiment.

Mobile device 900 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 9, some embodiments may have a separate DSP 920, depending on desired functionality. Mobile device 900 also can include one or more input devices 970, which can include without limitation a touch screen, a touch pad, microphone, button(s), dial(s), switch(es), and/or the like; and one or more output devices 915, which can include without limitation a display, light emitting diodes (LEDs), speakers, and/or the like.

Mobile device 900 might also include a wireless communication subsystem 930, which can include without limitation a modem, a network card, an infrared communication device, a wireless communication device, a near-field communication (NFC) device, and/or a chipset (such as a Bluetooth device, an International Electrical and Electronics Engineers (IEEE) 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 930 may permit data to be exchanged with a network, wireless access points, other computer systems, and/or any other electronic devices described herein. The communication can be carried out via one or more wireless communication antenna(s) 932 that send and/or receive wireless signals 934.

Depending on desired functionality, wireless communication subsystem 930 can include separate transceivers to communicate with antennas of base transceiver stations and other wireless devices and access points as described above, which may include communicating with different data networks and/or network types, such as wireless wide-area networks (WWANs), wireless local area networks (WLANs), or wireless personal area networks (WPANs). A WWAN may be a network using any air interface technology, for example, a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, W-CDMA, and so on. Cdma2000 includes IS-95, IS-2000, and/or IS-856 standards. A TDMA network may implement GSM, Digital Advanced Mobile Phone System (D-AMPS), or some other RATs. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Mobile device 900 may include a clock 945 on bus 905, which can generate a signal to synchronize various components on bus 905. Clock 945 may include an inductor-capacitor (LC) oscillator, a crystal oscillator, a ring oscillator, a digital clock generator such as a clock divider or clock multiplexer, a phase locked loop, or other clock generator. Clock 945 may be synchronized (or substantially synchronized) with corresponding clocks on other wireless devices. Clock 945 may be driven by wireless communication subsystem 930, which may be used to synchronize clock 945 of mobile device 900 to one or more other devices. Clock 945 may be used for timing measurement.

Mobile device 900 can further include sensor(s) 940. Such sensors can include, without limitation, one or more accelerometer(s), gyroscope(s), camera(s), magnetometer(s), altimeter(s), microphone(s), proximity sensor(s), light sensor(s), touch sensor(s), RF sensor(s), audio sensor(s), and the like.

Embodiments of the mobile device 900 may also include an SPS receiver 980 capable of receiving signals 984 from one or more SPS satellites using an SPS antenna 982. Signals 984 may be used to determine a location of mobile device 900, for example, for navigating the autonomous vehicle. SPS receiver 980 can extract a position of the mobile device 900, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 980 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Mobile device 900 may further include and/or be in communication with a memory 960. Memory 960 may include any non-transitory storage device, and may include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

Memory 960 of mobile device 900 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIGS. 5, 6, and 8, might be implemented as code and/or instructions that can be stored or loaded in memory 960 and be executed by mobile device 900, a processing unit within mobile device 900, and/or another device of a wireless system. In an aspect, such code and/or instructions can be used to configure and/or adapt a general purpose computer (or other device) to perform one or more operations in accordance with the described methods.

Figure 10:
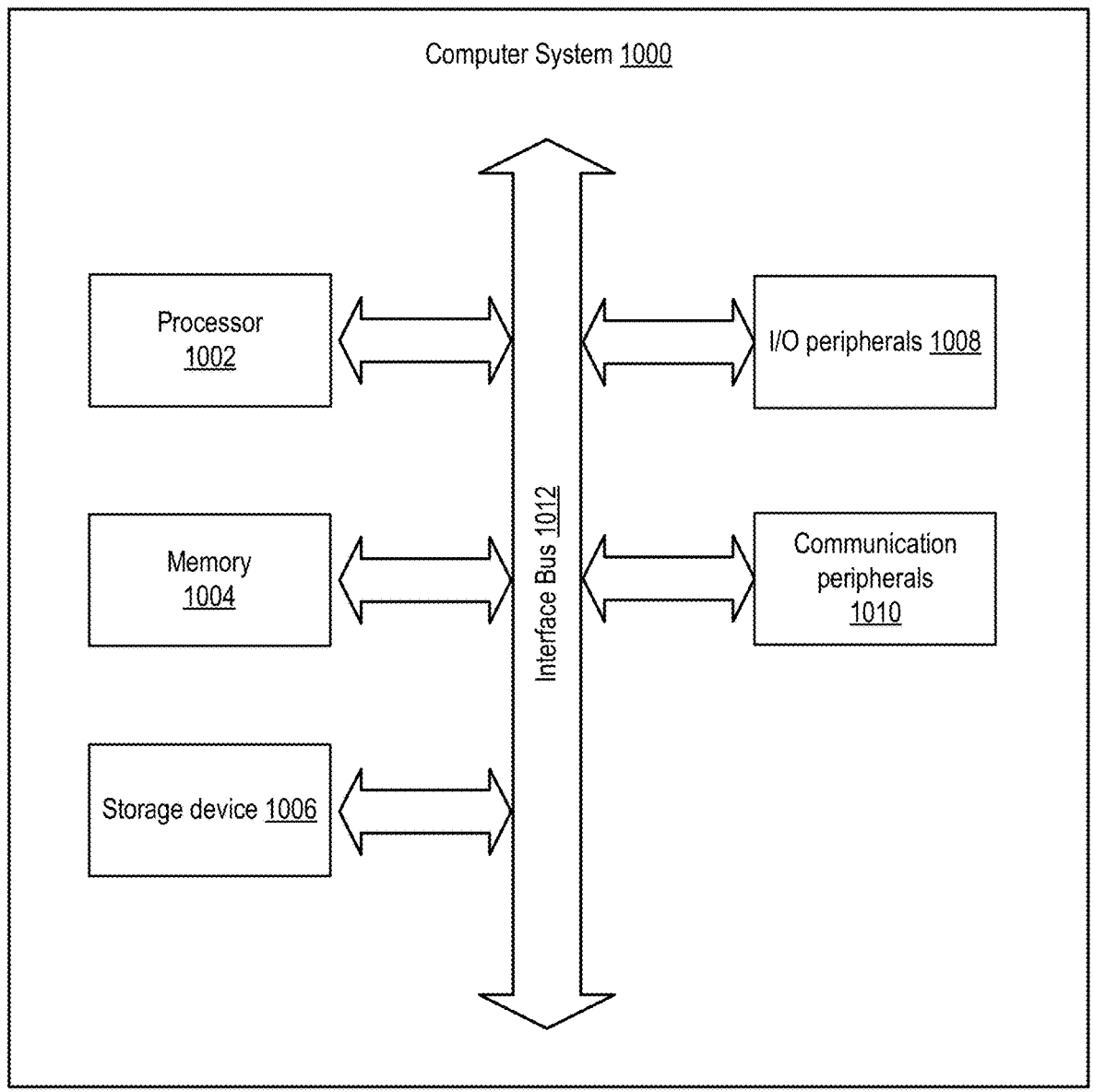
FIG. 10 is a simplified block diagram of an example of a computer system for implementing some techniques disclosed herein according to certain embodiments.

FIG. 10 illustrates an example computer system 1000 for implementing some of the embodiments disclosed herein. For example, computer system 1000 may be used to implement any of the operation server, security server, vehicle electronic system, and the user device described above. Computer system 1000 may have a distributed architecture, where some of the components (e.g., memory and processor) are part of an end user device and some other similar components (e.g., memory and processor) are part of a computer server. Computer system 1000 includes at least a processor 1002, a memory 1004, a storage device 1006, input/output (I/O) peripherals 1008, communication peripherals 1010, and an interface bus 1012. Interface bus 1012 is configured to communicate, transmit, and transfer data, controls, and commands among the various components of computer system 1000. Memory 1004 and storage device 1006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 1004 and storage device 1006 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 1000.

Further, memory 1004 includes an operating system, programs, and applications. Processor 1002 is configured to execute the stored instructions and includes, for example, a logical processing unit, a microprocessor, a digital signal processor, and other processors. Memory 1004 and/or processor 1002 can be virtualized and can be hosted within another computing systems of, for example, a cloud network or a data center. I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 1008 are connected to processor 1002 through any of the ports coupled to interface bus 1012. Communication peripherals 1010 are configured to facilitate communication between computer system 1000 and other computing devices over a communications network and include, for example, a network interface controller, modem, wireless and wired interface cards, antenna, and other communication peripherals.

It should be appreciated that computer system 1000 is illustrative and not intended to limit embodiments of the present disclosure. Many other configurations having more or fewer components than computer system 1000 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®' and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising:
receiving, by a transportation service platform, a passenger secret and a request for a transportation service, the passenger secret including passenger biometric information encrypted using a secret key that is generated by a user device;
selecting, by the transportation service platform based on the request, a vehicle for providing the requested transportation service;
determining, by the transportation service platform, a vehicle access token (VAT) for the selected vehicle;
sending, by the transportation service platform, a first copy of the VAT to the user device; and
sending, by the transportation service platform, the passenger secret and a second copy of the VAT to the selected vehicle,
wherein a match between the first copy of the VAT and the second copy of the VAT indicates that a vehicle having the second copy of the VAT is the selected vehicle; and
wherein the passenger secret is used for authenticating a user of the user device based on biometric information of the user, before unlocking a door of the selected vehicle for providing the requested transportation service.

2. The method of claim 1, further comprising:
determining, by the transportation service platform, an expiration time period for the VAT; and
sending, by the transportation service platform, the expiration time period for the VAT to the user device,
wherein the match between the first copy of the VAT and the second copy of the VAT is invalid after the expiration time period.

3. The method of claim 1, wherein:
the transportation service platform includes an operation server and a security server;
selecting the vehicle and determining the VAT include:
selecting, by the operation server, the selected vehicle from a plurality of vehicles;
sending, by the operation server to the security server, a dispatch request including an identification of the selected vehicle and the passenger secret; and
determining, by the security server, the VAT for the selected vehicle.

4. The method of claim 3, wherein sending the first copy of the VAT to the user device includes:
sending, by the security server, the first copy of the VAT to the operation server; and
sending, by the operation server, the first copy of the VAT to the user device.

5. The method of claim 1, wherein the passenger biometric information includes at least one of a fingerprint, an iris pattern, a voice spectrum, or a facial feature.

6. The method of claim 1, further comprising:
storing, by the transportation service platform, the passenger secret,
wherein the passenger secret has an expiration time after which the passenger secret is invalid.

7. The method of claim 1, further comprising setting the VAT as an invalid VAT after an expiration time period has expired.

8. A system comprising:
one or more processors;
one or more machine-readable, non-transitory storage mediums that include instructions configured to cause the one or more processors to perform operations including:
receiving, by a transportation service platform, a passenger secret and a request for a transportation service, the passenger secret including passenger biometric information encrypted using a secret key that is generated by a user device;
selecting, by the transportation service platform based on the request, a vehicle for providing the requested transportation service;
determining, by the transportation service platform, a vehicle access token (VAT) for the selected vehicle;

sending, by the transportation service platform, a first copy of the VAT to the user device; and sending, by the transportation service platform, the passenger secret and a second copy of the VAT to the selected vehicle, wherein a match between the first copy of the VAT and the second copy of the VAT indicates that a vehicle having the second copy of the VAT is the selected vehicle; and wherein the passenger secret is used for authenticating a user of the user device based on biometric information of the user, before unlocking a door of the selected vehicle for providing the requested transportation service.

9. The system of claim 8, wherein the instructions are further configured to cause the one or more processors to perform operations including:

determining, by the transportation service platform, an expiration time period for the VAT; and sending, by the transportation service platform, the expiration time period for the VAT to the user device, wherein the match between the first copy of the VAT and the second copy of the VAT is invalid after the expiration time period.

10. The system of claim 8, wherein the transportation service platform includes an operation server and a security server, and wherein:

selecting the vehicle and determining the VAT includes:

selecting, by the operation server, the selected vehicle from a plurality of vehicles;

sending, by the operation server to the security server, a dispatch request including an identification of the selected vehicle and the passenger secret; and determining, by the security server, the VAT for the selected vehicle.

11. The system of claim 10, wherein sending the first copy of the VAT to the user device includes:

sending, by the security server, the first copy of the VAT to the operation server; and sending, by the operation server, the first copy of the VAT to the user device.

12. The system of claim 8, wherein the passenger biometric information includes at least one of a fingerprint, an iris pattern, a voice spectrum, or a facial feature.

13. The system of claim 8, wherein the instructions are further configured to cause the one or more processors to perform operations including:

storing, by the transportation service platform, the passenger secret, wherein the passenger secret has an expiration time after which the passenger secret is invalid.

14. A non-transitory computer-program product tangibly embodied in a machine-readable non-transitory storage medium that includes instructions configured to cause one or more processors to:

receive, by a transportation service platform, a passenger secret and a request for a transportation service, the passenger secret including passenger biometric information encrypted using a secret key that is generated by a user device;

select, by the transportation service platform based on the request, a vehicle for providing the requested transportation service;

determine, by the transportation service platform, a vehicle access token (VAT) for the selected vehicle;

send, by the transportation service platform, a first copy of the VAT to the user device; and send, by the transportation service platform, the passenger secret and a second copy of the VAT to the selected vehicle, wherein a match between the first copy of the VAT and the second copy of the VAT indicates that a vehicle having the second copy of the VAT is the selected vehicle; and wherein the passenger secret is used for authenticating a user of the user device based on biometric information of the user, before unlocking a door of the selected vehicle for providing the requested transportation service.

15. The computer-program product of claim 14, wherein the instructions are further configured to cause the one or more processors to perform operations including:

determine, by the transportation service platform, an expiration time period for the VAT; and send, by the transportation service platform, the expiration time period for the VAT to the user device, wherein the match between the first copy of the VAT and the second copy of the VAT is invalid after the expiration time period.

16. The computer-program product of claim 14, wherein the transportation service platform includes an operation server and a security server, and wherein the instructions are further configured to cause the one or more processors to:

select the vehicle and determining the VAT include:

select, by the operation server, the selected vehicle from a plurality of vehicles;

send, by the operation server to the security server, a dispatch request including an identification of the selected vehicle and the passenger secret; and determine, by the security server, the VAT for the selected vehicle.

17. The computer-program product of claim 16, wherein sending the first copy of the VAT to the user device includes:

sending, by the security server, the first copy of the VAT to the operation server; and sending, by the operation server, the first copy of the VAT to the user device.

18. The computer-program product of claim 14, wherein the passenger biometric information includes at least one of a fingerprint, an iris pattern, a voice spectrum, or a facial feature.

19. The computer-program product of claim 14, wherein the instructions are further configured to cause the one or more processors to:

store, by the transportation service platform, the passenger secret, wherein the passenger secret has an expiration time after which the passenger secret is invalid.

20. The computer-program product of claim 14, wherein the instructions are further configured to cause the one or more processors to set the VAT as an invalid VAT after an expiration time period has expired.

* * * * *